United States Patent
McVey et al.

(10) Patent No.: US 11,871,871 B2
(45) Date of Patent: Jan. 16, 2024

(54) PORTABLE COOKING STATIONS HAVING INTERLOCKING SEAR GRATES AND GRIDDLES

(71) Applicant: Weber-Stephen Products LLC, Palatine, IL (US)

(72) Inventors: Cassandra A.S. McVey, Wheeling, IL (US); Romualdo Sonny Siazon, Woodstock, IL (US); Brett Jessogne, Mundelein, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 428 days.

(21) Appl. No.: 16/932,261

(22) Filed: Jul. 17, 2020

(65) Prior Publication Data

US 2022/0015574 A1   Jan. 20, 2022

(51) Int. Cl.
*A47J 37/06* (2006.01)
*A47J 37/07* (2006.01)

(52) U.S. Cl.
CPC ......... *A47J 37/067* (2013.01); *A47J 37/0786* (2013.01); *A47J 2037/0795* (2013.01)

(58) Field of Classification Search
CPC .............. A47J 37/067; A47J 37/0786; A47J 2037/0795; A47J 37/0664
See application file for complete search history.

(56) References Cited

U.S. PATENT DOCUMENTS

| | | | |
|---|---|---|---|
| 1,421,393 A | 7/1922 | Boyle | |
| D286,494 S | 11/1986 | Lastuck | |
| 4,727,853 A | 3/1988 | Stephen et al. | |
| 4,930,491 A | 6/1990 | Purello | |
| 5,355,779 A | 10/1994 | O'Brien et al. | |
| 5,490,452 A * | 2/1996 | Schlosser | A47J 37/0694 99/422 |
| 5,524,528 A | 6/1996 | Yeh | |
| D380,342 S | 7/1997 | Edmonds | |
| 5,964,517 A * | 10/1999 | Adams | A47J 37/0786 362/120 |
| 6,131,505 A | 10/2000 | Lin | |
| D436,796 S | 1/2001 | Kalina et al. | |
| D441,250 S | 5/2001 | Choi | |

(Continued)

FOREIGN PATENT DOCUMENTS

| | | |
|---|---|---|
| CN | 205386075 | 7/2016 |
| CN | 306306721 S | 2/2021 |

(Continued)

OTHER PUBLICATIONS

Taiwan Patent Office, "Office Action and Search Report," issued in connection with Taiwan Patent Application No. 110100625, dated Sep. 22, 2021 (20 pages).

(Continued)

*Primary Examiner* — John J Norton
*Assistant Examiner* — Franklin Jefferson Wang
(74) *Attorney, Agent, or Firm* — Hanley, Flight & Zimmerman

(57) ABSTRACT

Portable cooking stations having interlocking sear grates and griddles are disclosed. An example portable cooking station includes a sear grate and a griddle. The griddle is configured to be removably interlocked to the sear grate in a side-by-side arrangement.

22 Claims, 21 Drawing Sheets

(56) References Cited

U.S. PATENT DOCUMENTS

| | | | |
|---|---|---|---|
| 6,644,175 B2 * | 11/2003 | Stephen | A47J 37/0786 126/41 R |
| D538,584 S | 3/2007 | Scholze et al. | |
| D564,826 S | 3/2008 | Chin | |
| D570,154 S | 6/2008 | Wang | |
| D588,399 S | 3/2009 | Vrbanek | |
| D592,908 S | 5/2009 | Hamlin | |
| D600,070 S | 9/2009 | Kellermann et al. | |
| D618,057 S | 6/2010 | Ormrod et al. | |
| D623,013 S * | 9/2010 | Alden | D7/409 |
| D668,506 S | 10/2012 | Zemel | |
| 8,387,611 B2 | 3/2013 | Bruno et al. | |
| D696,897 S | 1/2014 | Kunz | |
| D697,752 S | 1/2014 | De' Longhi et al. | |
| D697,757 S | 1/2014 | Xin | |
| D709,727 S | 7/2014 | Cloutier et al. | |
| D723,324 S | 3/2015 | Feriola et al. | |
| D751,333 S | 3/2016 | Moehl | |
| D758,786 S | 6/2016 | Koszylko | |
| D760,018 S | 6/2016 | Koszylko | |
| D766,038 S | 9/2016 | Dimino | |
| 9,560,928 B2 | 2/2017 | Parrish et al. | |
| D784,077 S * | 4/2017 | Zemel | D7/354 |
| D789,147 S | 6/2017 | Nilssen | |
| D793,162 S | 8/2017 | Hamlin | |
| 9,801,496 B1 * | 10/2017 | Lu | A47J 37/0694 |
| 9,839,323 B2 | 12/2017 | Parrish et al. | |
| D825,979 S | 8/2018 | Levy | |
| D818,711 S | 9/2018 | Nagrani | |
| D828,713 S | 9/2018 | Correa | |
| D829,052 S | 9/2018 | Gamble | |
| 10,136,761 B2 | 11/2018 | Deutsch | |
| 10,264,919 B2 | 4/2019 | Wenzel et al. | |
| D859,059 S | 9/2019 | Levy | |
| D880,931 S | 4/2020 | Tan et al. | |
| D949,625 S | 4/2022 | McVey et al. | |
| D959,892 S | 8/2022 | Li | |
| D959,907 S | 8/2022 | Buschman et al. | |
| 2015/0068512 A1 * | 3/2015 | Mehler | A47J 37/0694 126/305 |
| 2017/0105574 A1 | 4/2017 | Parrish | |
| 2018/0317704 A1 * | 11/2018 | Frybarger | A47J 36/02 |
| 2018/0333001 A1 | 11/2018 | Nie | |

FOREIGN PATENT DOCUMENTS

| | | | |
|---|---|---|---|
| DE | 202014010338 U1 * | 7/2015 | A47J 37/0704 |
| JP | 1568242 S | 1/2017 | |
| JP | 1606094 S | 6/2018 | |
| JP | 1660856 S | 6/2020 | |
| KR | 200344213 Y1 * | 3/2004 | |
| KR | 20-0394369 | 8/2005 | |
| KR | 200394369 Y1 * | 8/2005 | |
| KR | 20-0405647 | 1/2006 | |
| KR | 20100038622 A * | 4/2010 | |
| KR | 101489406 B1 * | 2/2015 | |
| KR | 10-2145070 | 8/2020 | |
| TW | 217179 | 12/1993 | |
| TW | 312420 | 8/1997 | |
| TW | D201966 | 1/2020 | |
| WO | 9201413 | 2/1992 | |
| WO | WO-9201413 A1 * | 2/1992 | |
| WO | 2015172893 | 11/2015 | |
| WO | 2017114028 | 7/2017 | |

OTHER PUBLICATIONS

United States Patent and Trademark Office, "Notice of Allowance and Fee(s) Due," issued in connection with U.S. Appl. No. 29/743,064, dated Dec. 29, 2021, 6 pages.

Taiwan Intellectual Property Office, "Allowance Decision of Examination," issued in connection with Taiwan Patent Application No. 110100625, dated Jan. 7, 2022, 3 pages.

Canadian Intellectual Property Office, "Notice of Registration," issued in connection with Canadian Patent Application No. 198067, dated Mar. 9, 2022, 9 pages.

Taiwan Intellectual Property Office, "Allowance Decision of Examination," issued in connection with Taiwanese Patent Application No. 110300043, dated May 11, 2021, 5 pages.

IP Australia, "Certificate of Examination," issued in connection with Australian Patent Application No. 202014610, dated Apr. 12, 2021, 2 pages.

European Union Intellectual Property Office, "Certificate of Registration No. 008168751-0001," issued on Sep. 12, 2020, 4 pages.

IP Australia, "Certificate of Registration," issued in connection with Australian Patent Application No. 202014610, dated Nov. 9, 2020, 8 pages.

China National Intellectual Property Administration, "Notice of Decision of Grant of Patent," issued in connection with Chinese Patent Application No. 202030531077.8, dated Jan. 4, 2021, 4 pages.

International Searching Authority, "International Search Report and Written Opinion," issued in connection with International Patent Application No. PCT/US2020/047204, dated Apr. 2, 2021, 12 pages.

Taiwan Intellectual Property Office, "Patent Certificate No. I762143," issued in connection with Taiwan Patent Application No. 110100625, dated Apr. 21, 2022, 80 pages. (non-certified machine translation included).

Soldbbq Combination Replacement Griddle and Cooking Grate. Date First Available on Amazon.com Nov. 18, 2019. https://www.amazon.com/soldbbq-Combination-Replacement-Compatible-Griddle-Cooking/dp/B081 PSF7FJ/ref (Year: 2019), 1 page.

United States Patent And Trademark Office, "Notice of Allowance and Fee(s) Due," issued in connection with U.S. Appl. No. 29/830,434, dated Nov. 16, 2022, 7 pages.

International Bureau, "International Preliminary Report on Patentability," issued in connection with International Patent Application No. PCT/US2020/047204, dated Jan. 17, 2023, 8 pages.

United States Patent and Trademark Office, "Corrected Notice of Allowability," issued in connection with U.S. Appl. No. 29/830,434, dated Jan. 30, 2023, 6 pages.

Soldbbq Combination Replacement Griddle and Cooking Grate. Date Available on Amazon.com Nov. 18, 2019, https://www.amazon.com/soldbbq-combination-Compatible-Griddle-Cooking/dp/B081PSF7fJ/ref (Year: 2019).

* cited by examiner

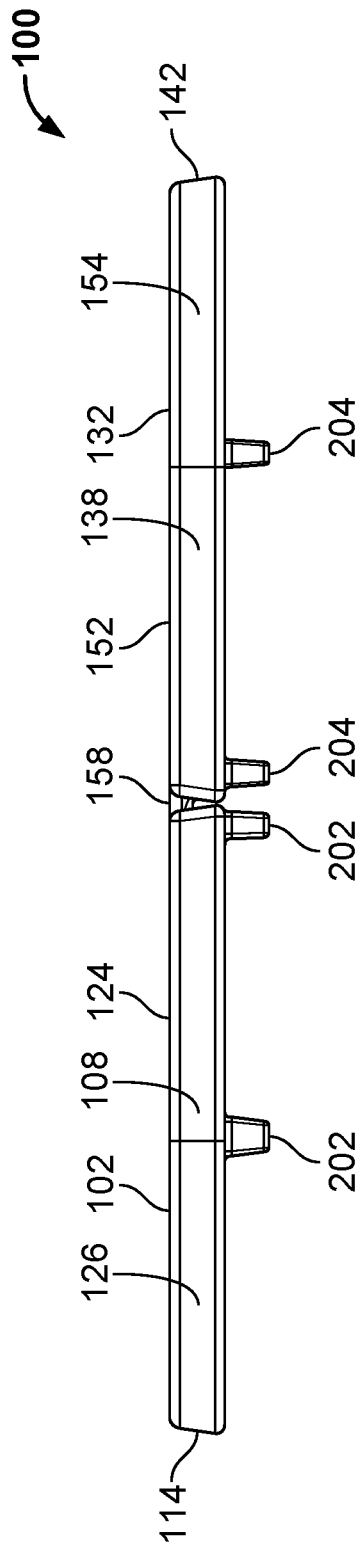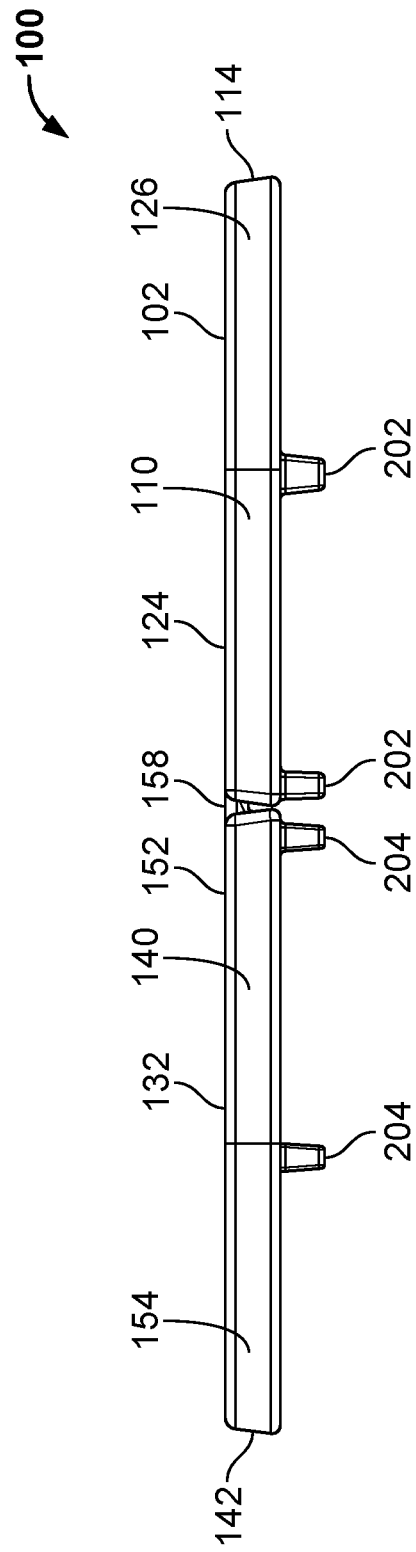

SECTION A-A

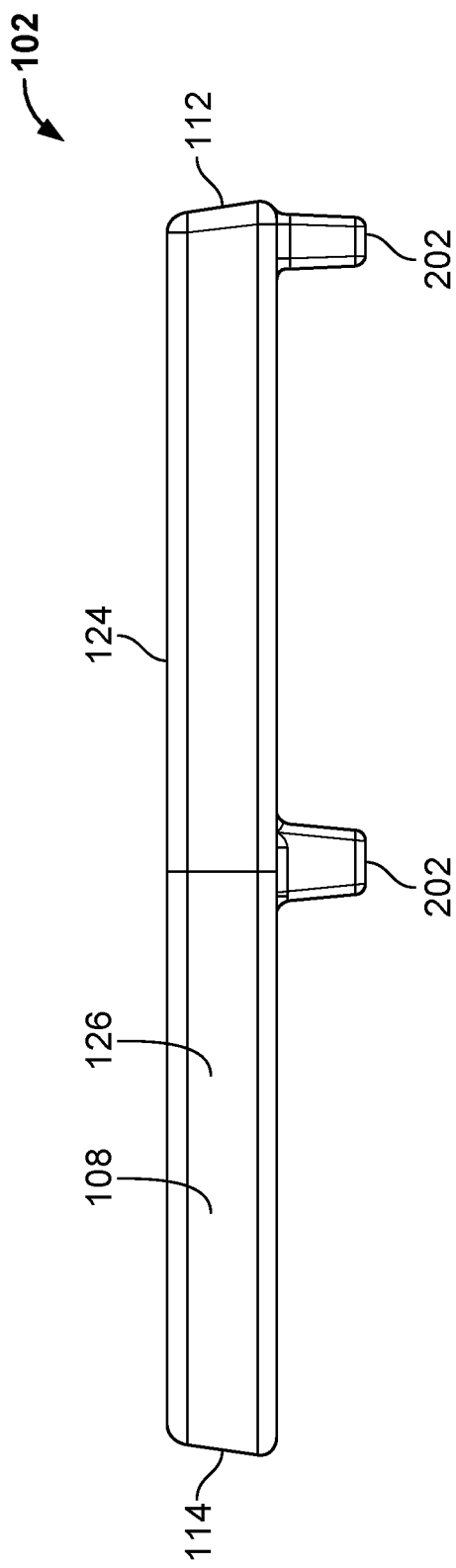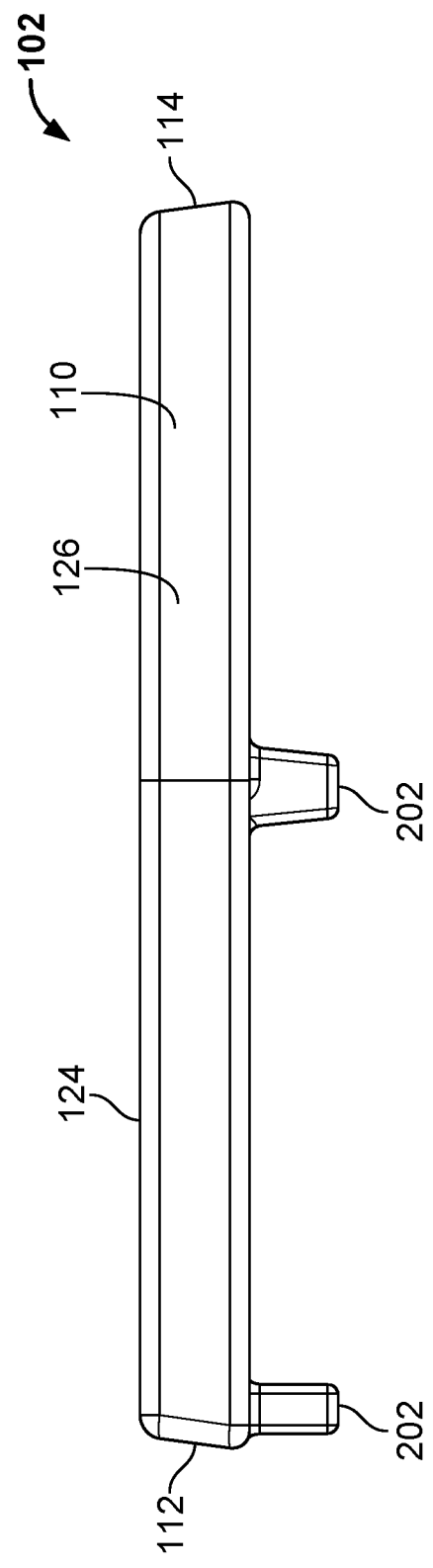

SECTION B-B

PORTABLE COOKING STATIONS HAVING INTERLOCKING SEAR GRATES AND GRIDDLES

FIELD OF THE DISCLOSURE

This disclosure relates generally to portable cooking stations and, more specifically, to portable cooking stations having interlocking sear grates and griddles.

BACKGROUND

Modular grate systems for grills are well known. Conventional modular grate systems include a central grate that is circumscribed and/or bounded by one or more peripheral grate(s), with the central grate being removably positioned, seated, and/or docked on the peripheral grate(s). Removal of the central grate from the peripheral grate(s) results in a central opening of the peripheral grate(s) being exposed. The central opening is configured to be selectively filled and/or selectively covered by one of various cooking accessories (e.g., a pizza stone, a wok, etc.) that are each configured to be removably positioned, seated, and/or docked on the peripheral grate(s) relative to the central opening.

BRIEF DESCRIPTION OF THE DRAWINGS

FIG. 2 is a front view of the portable cooking station of FIG. 1.

FIG. 3 is a rear view of the portable cooking station of FIGS. 1 and 2.

FIG. 10 is a front view of the sear grate of the portable cooking station of FIGS. 1-9 in isolation.

FIG. 11 is a rear view of the sear grate of the portable cooking station of FIGS. 1-10 in isolation.

Figure 1:
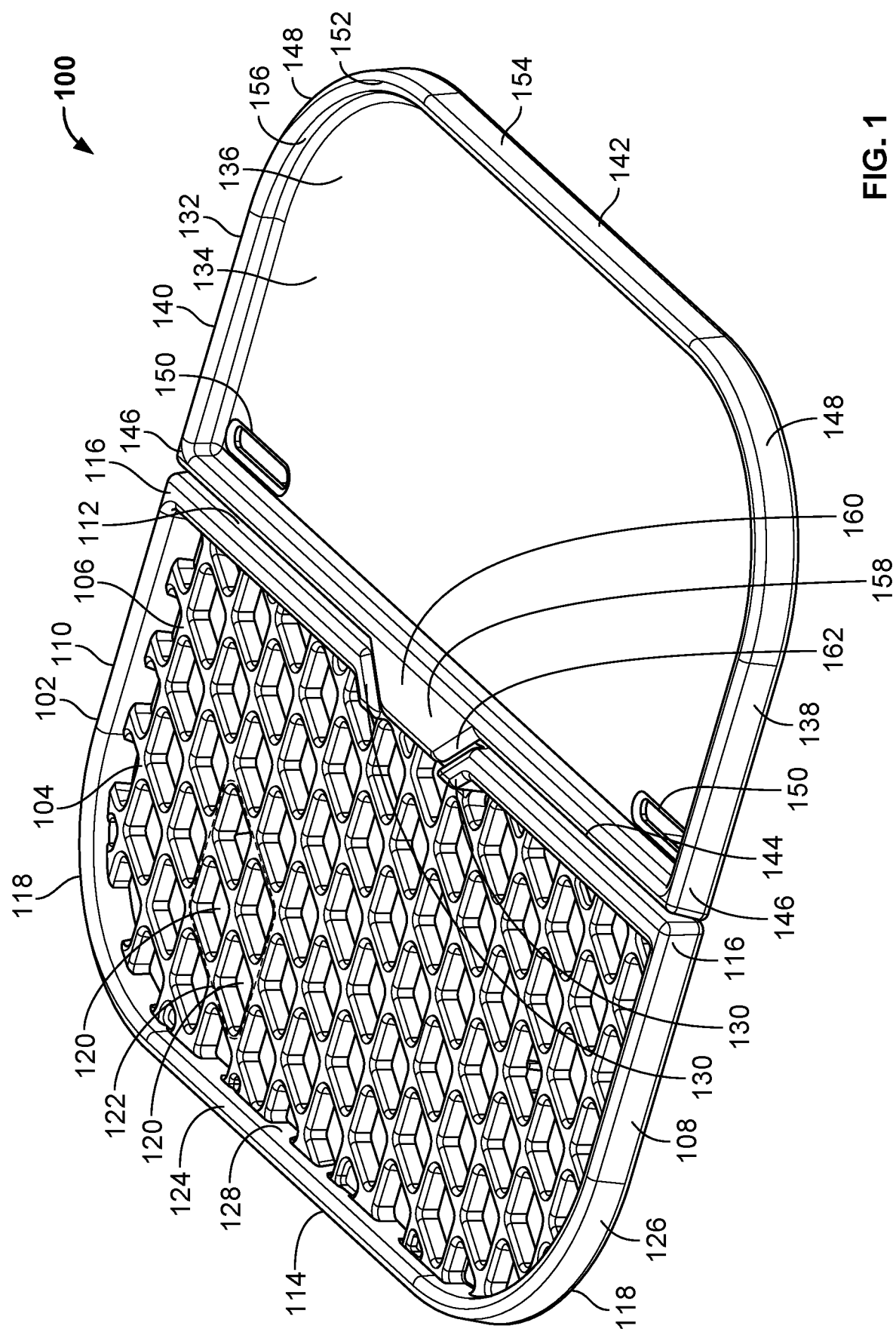
FIG. 1 is a perspective view of an example portable cooking station constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example portable cooking stations disclosed herein include interlocking sear grates and griddles. In some examples, portable cooking stations disclosed herein include a sear grate and a griddle, with the griddle being configured to be interlocked to the sear grate in a side-by-side arrangement. The side-by-side arrangement of the sear grate and the griddle of the portable cooking station advantageously enables one food item to be cooked on the sear grate while another food item is being cooked on the griddle. The side-by-side arrangement of the sear grate and the griddle of the portable cooking station also advantageously enables one food item to be cooked on the sear grate at a first time and another food item to be cooked on the griddle at a second time (e.g., prior to or subsequent to the first time) without the need for changing out separate cooking stations (e.g., a griddle independent from the sear grate) relative to a central opening of a modular grate system at which the portable cooking station is docked.

When the disclosed portable cooking station is not in use, the griddle can be unlocked from the sear grate and subsequently positioned in a face-to-face arrangement (e.g., as opposed to the above-described interlocked side-by-side arrangement) relative to the sear grate. Placing the griddle and the sear grate in a face-to face arrangement relative to one another reduces the overall footprint of the portable cooking station, which can be advantageous for transporting, cleaning, and/or storing the portable cooking station.

The above-identified features as well as other advantageous features of example portable cooking stations disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 4:
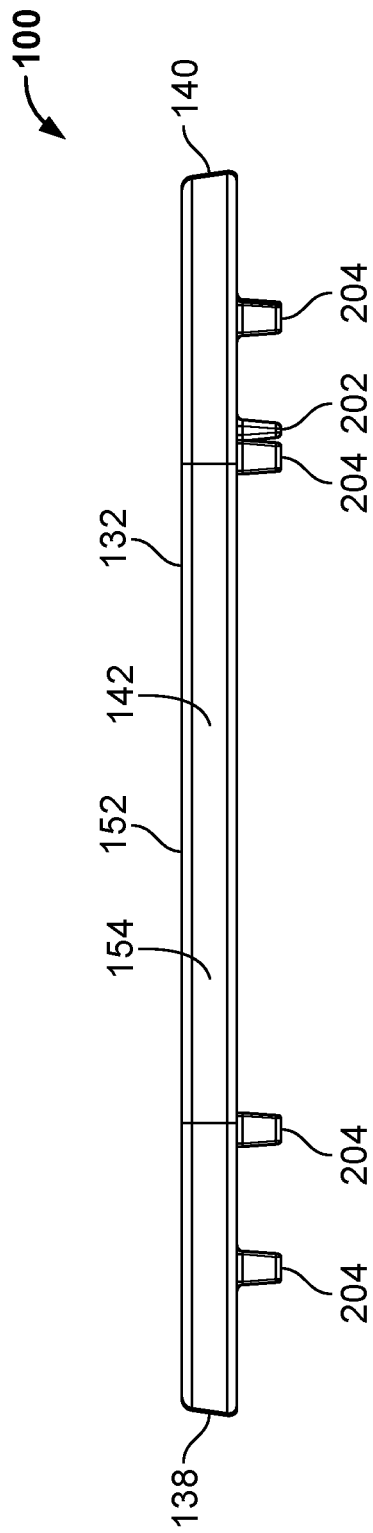
FIG. 4 is a right side view of the portable cooking station of FIGS. 1-3.
Figure 5:
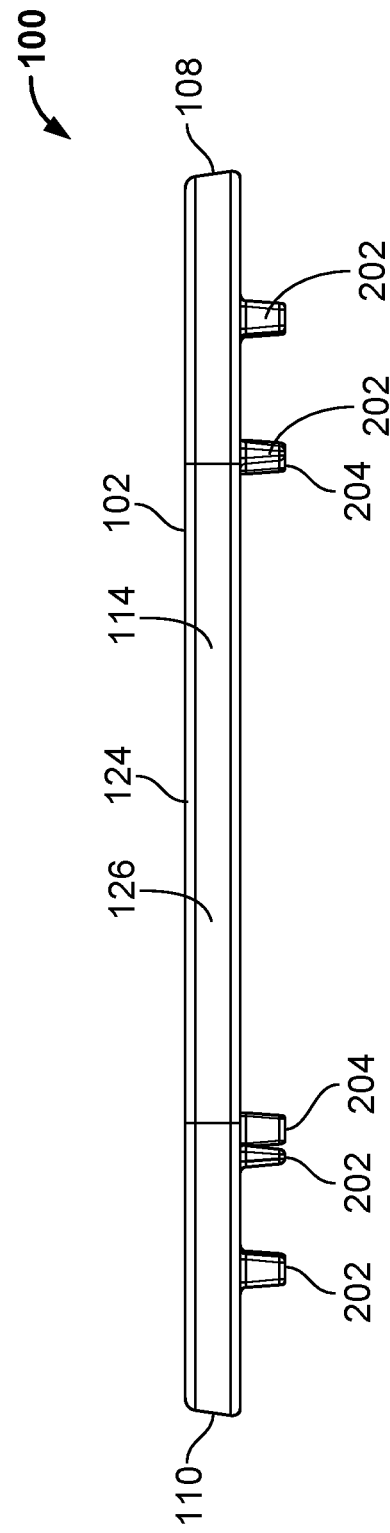
FIG. 5 is a left side view of the portable cooking station of FIGS. 1-4.
Figure 6:
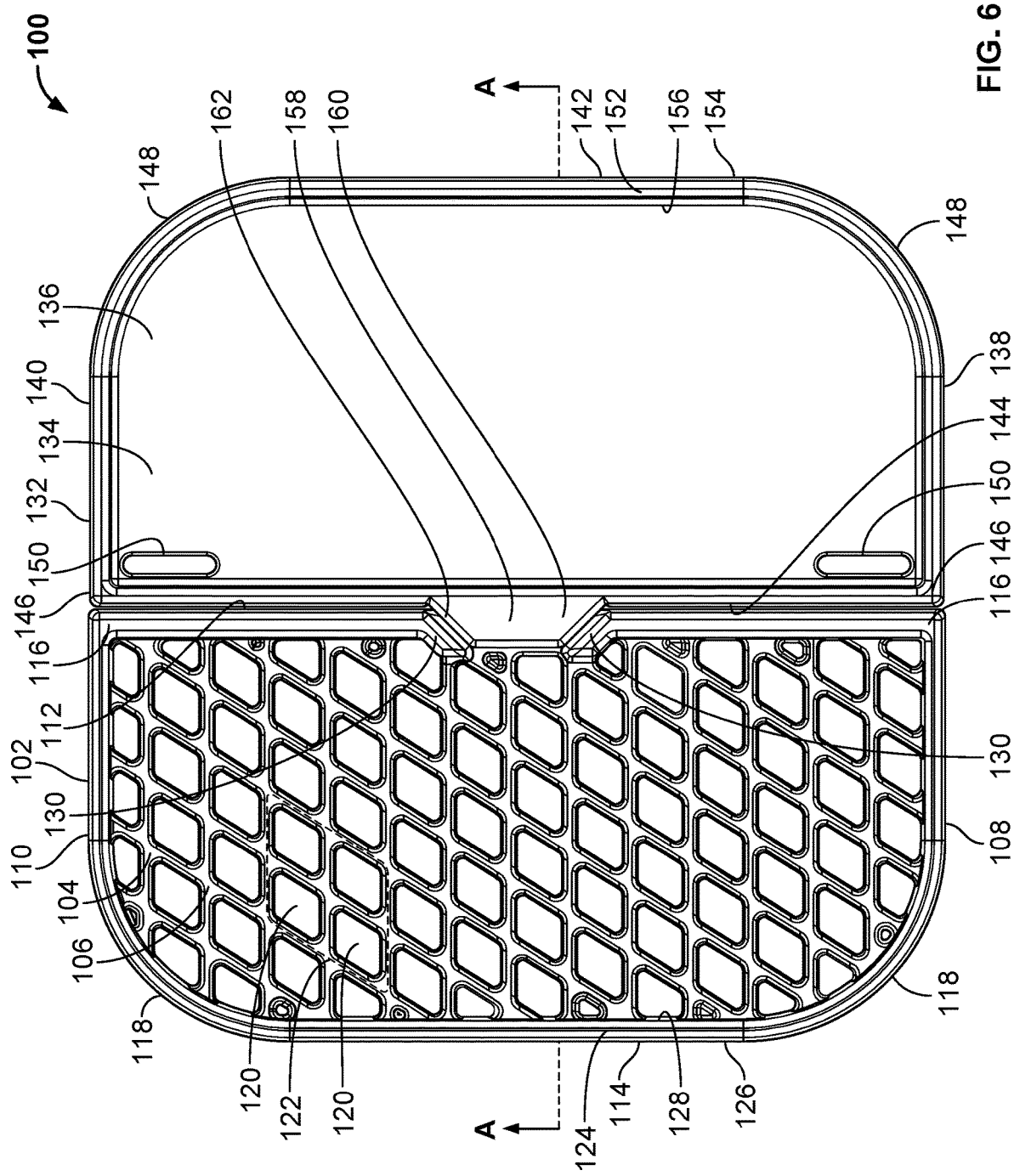
FIG. 6 is a top view of the portable cooking station of FIGS. 1-5.
Figure 7:
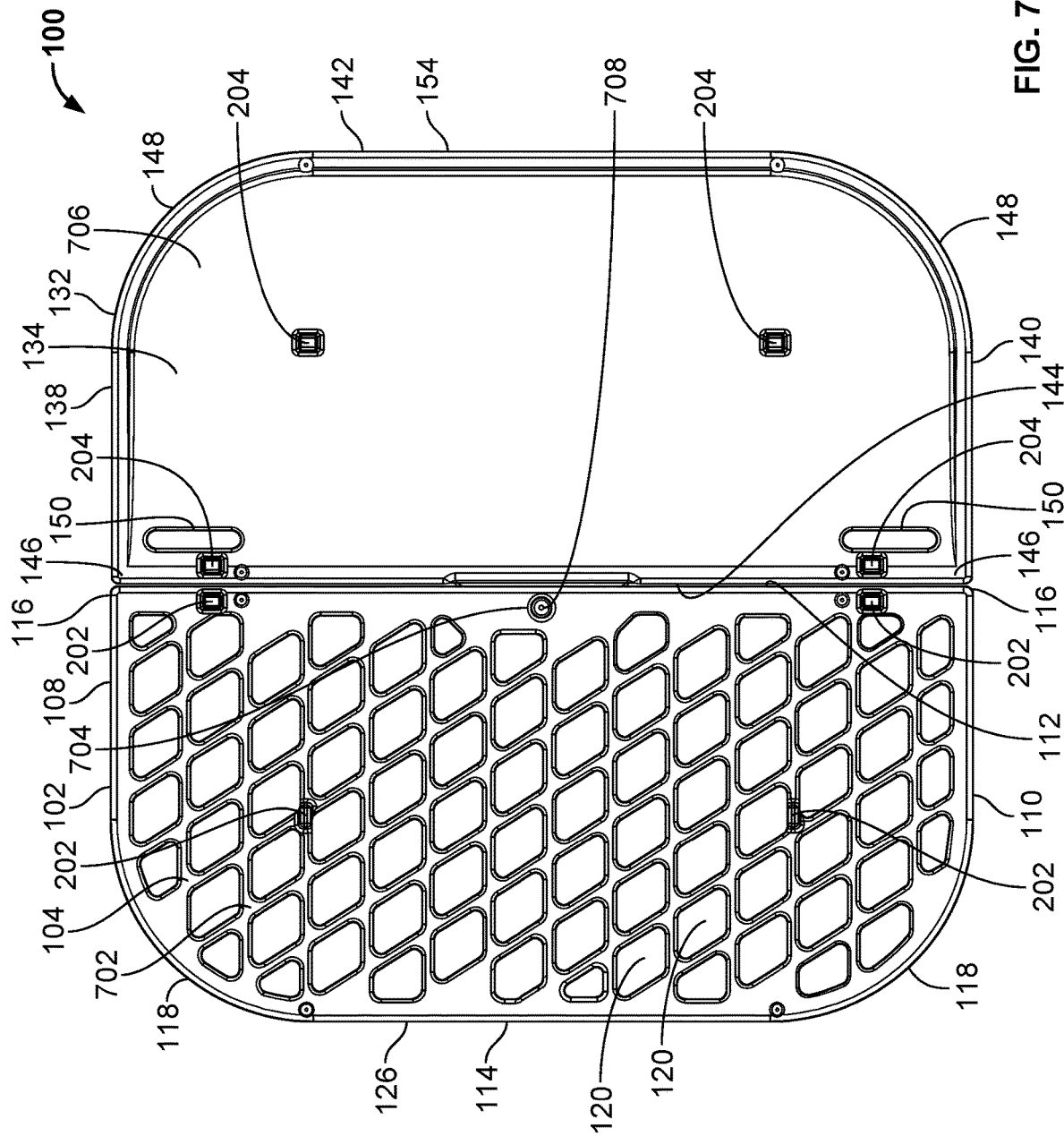
FIG. 7 is a bottom view of the portable cooking station of FIGS. 1-6.
Figure 8:
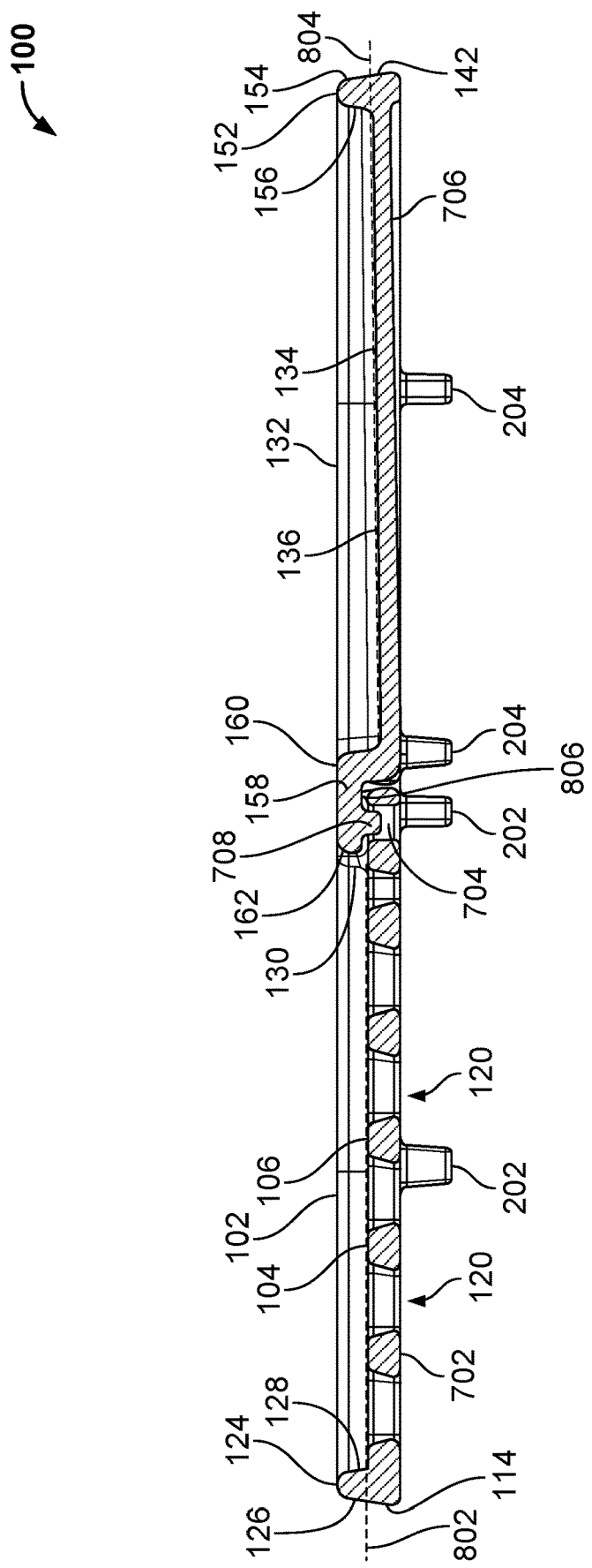
FIG. 8 is a cross-sectional view of the portable cooking station of FIGS. 1-7 taken along section A-A of FIG. 6.

FIG. 1 is a perspective view of an example portable cooking station 100 constructed in accordance with teachings of this disclosure. FIG. 2 is a front view of the portable cooking station 100 of FIG. 1. FIG. 3 is a rear view of the portable cooking station 100 of FIGS. 1 and 2. FIG. 4 is a right side view of the portable cooking station 100 of FIGS. 1-3. FIG. 5 is a left side view of the portable cooking station 100 of FIGS. 1-4. FIG. 6 is a top view of the portable cooking station 100 of FIGS. 1-5. FIG. 7 is a bottom view of the portable cooking station 100 of FIGS. 1-6. FIG. 8 is a cross-sectional view of the portable cooking station 100 of FIGS. 1-7 taken along section A-A of FIG. 6.

Figure 9:
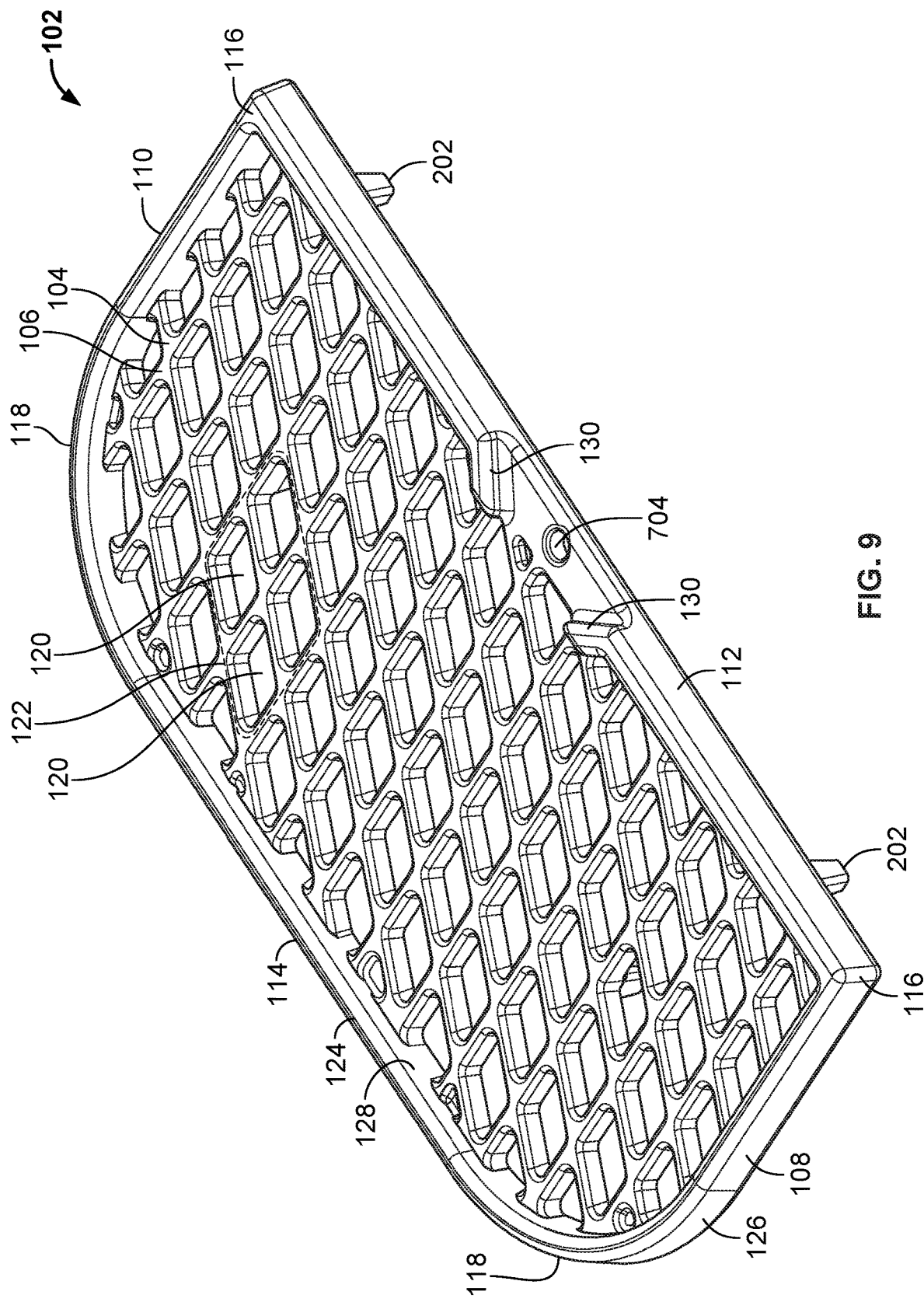
FIG. 9 is a perspective view of the sear grate of the portable cooking station of FIGS. 1-8 in isolation.
Figure 12:
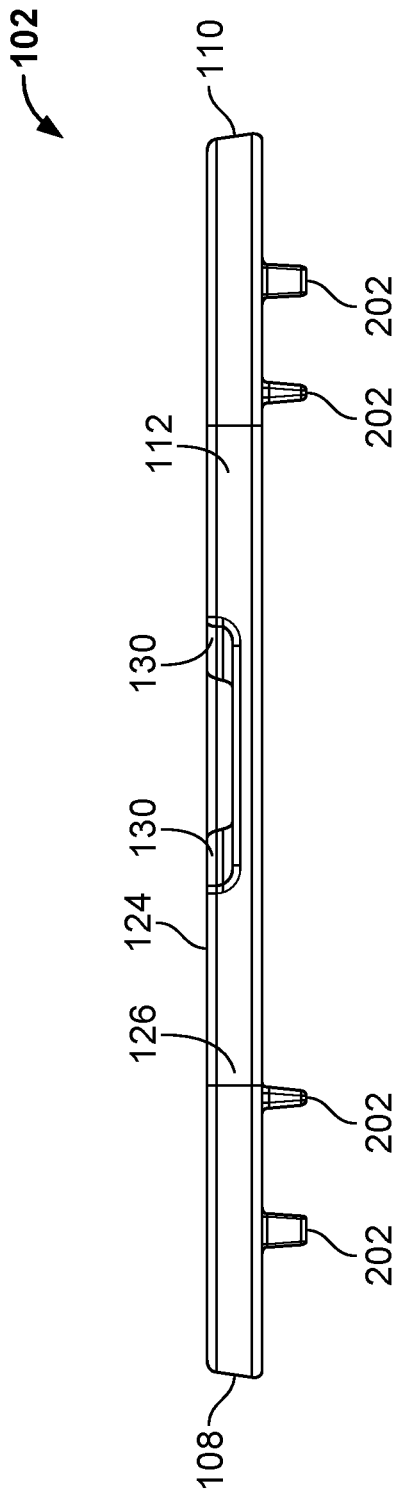
FIG. 12 is a right side view of the sear grate of the portable cooking station of FIGS. 1-11 in isolation.
Figure 13:
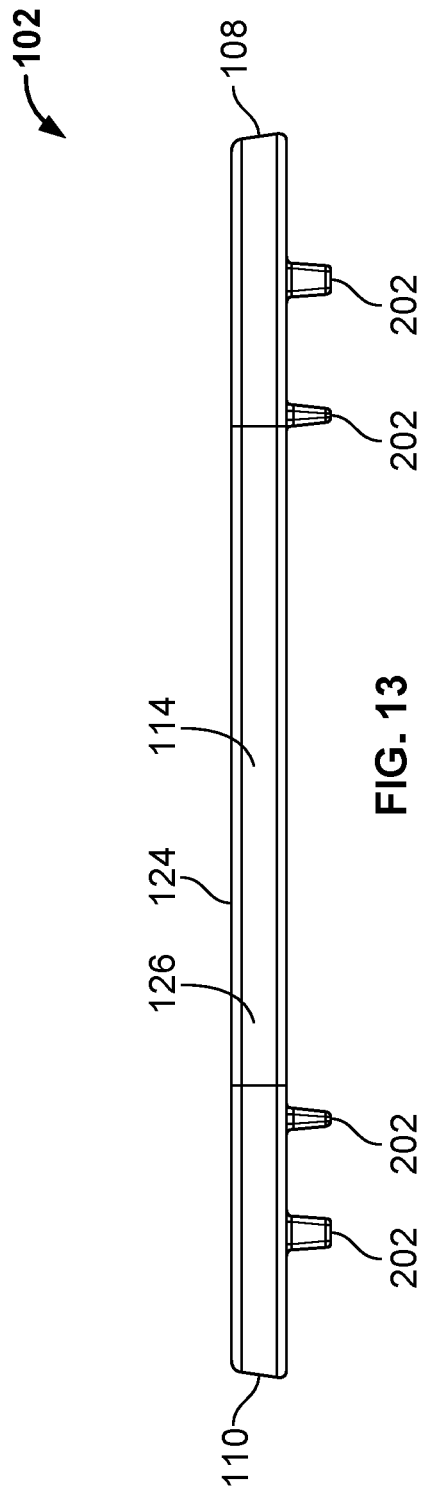
FIG. 13 is a left side view of the sear grate of the portable cooking station of FIGS. 1-12 in isolation.
Figure 14:
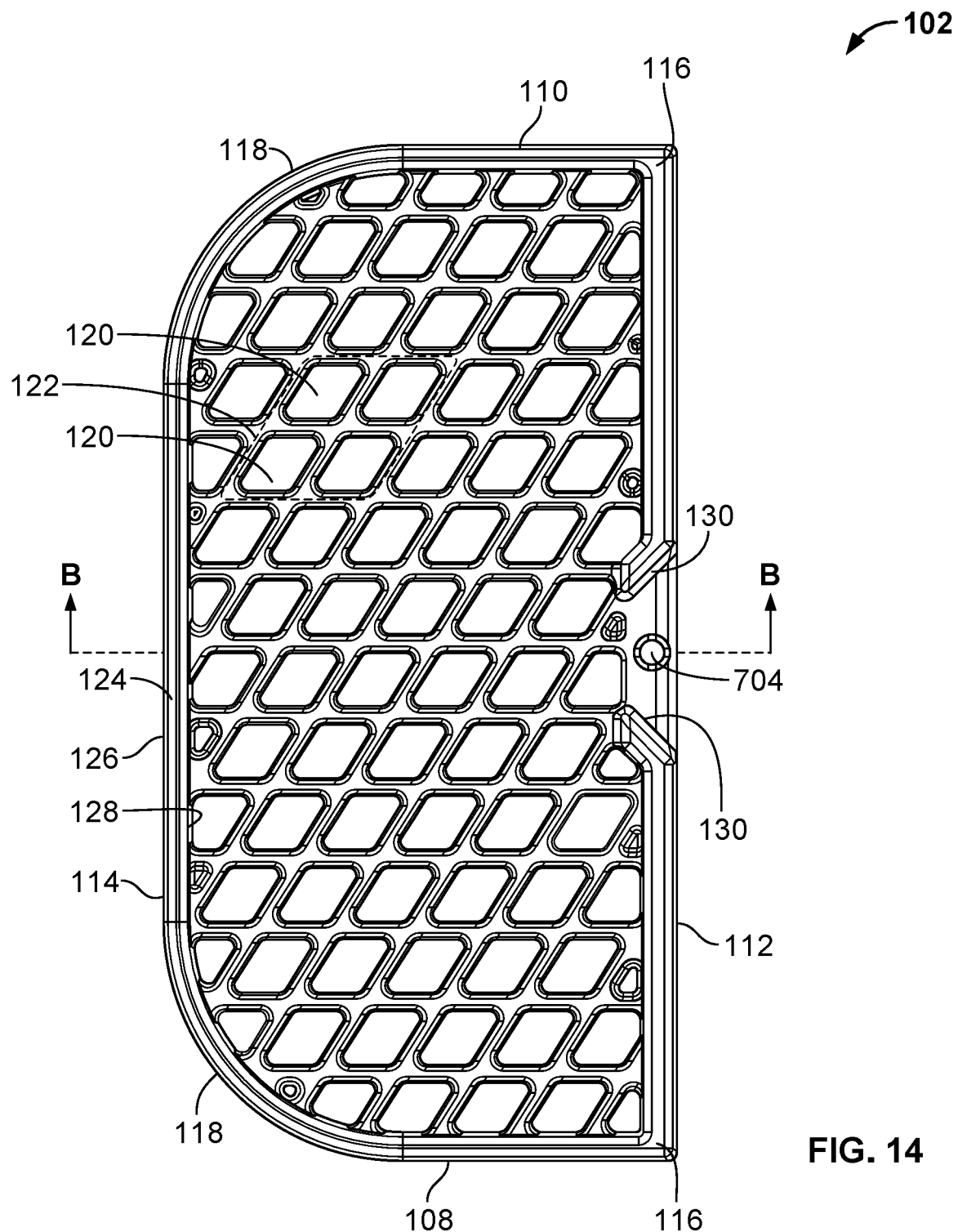
FIG. 14 is a top view of the sear grate of the portable cooking station of FIGS. 1-13 in isolation.
Figure 15:
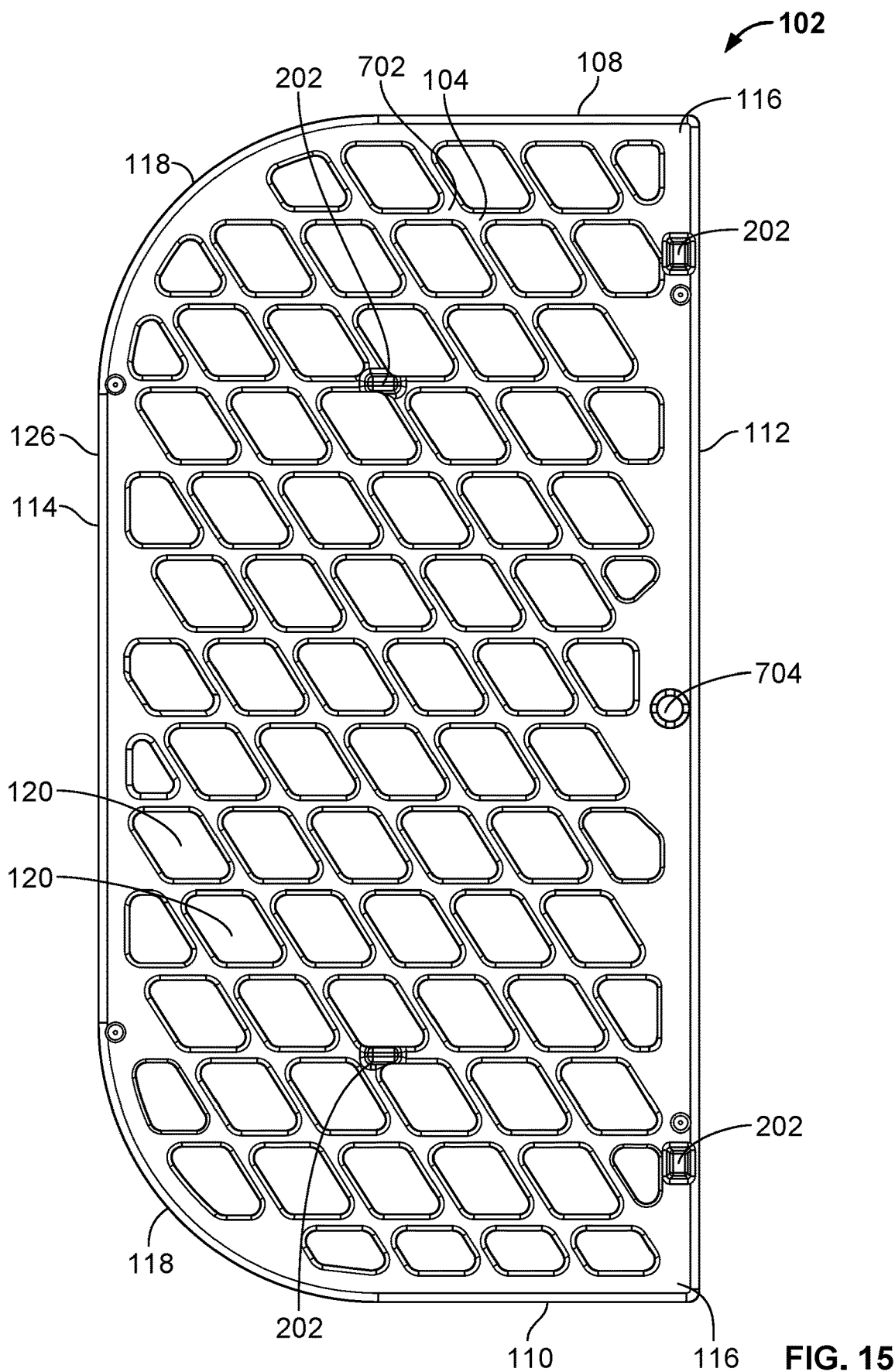
FIG. 15 is a bottom view of the sear grate of the portable cooking station of FIGS. 1-14 in isolation.
Figure 16:
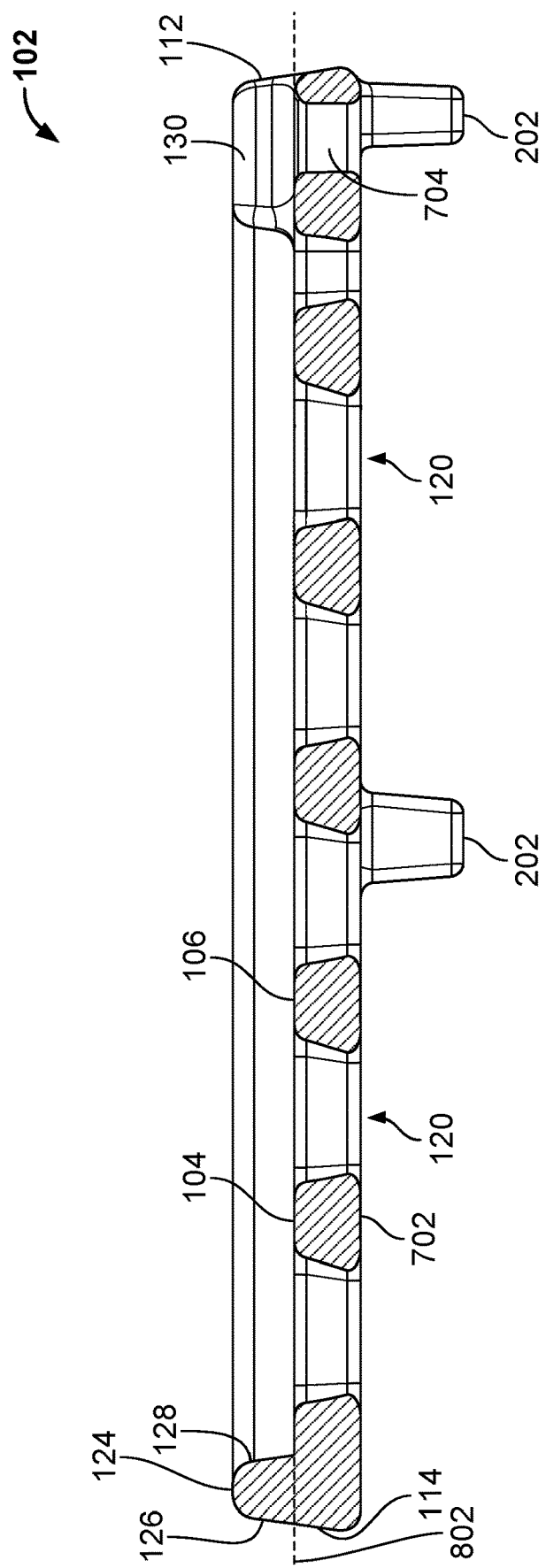
FIG. 16 is a cross-section view of the sear grate of the portable cooking station of FIGS. 1-9 in isolation and taken along section B-B of FIG. 14.

The portable cooking station 100 of FIGS. 1-8 includes an example sear grate 102. FIG. 9 is a perspective view of the sear grate 102 of the portable cooking station 100 of FIGS. 1-8 in isolation. FIG. 10 is a front view of the sear grate 102 of the portable cooking station 100 of FIGS. 1-9 in isolation. FIG. 11 is a rear view of the sear grate 102 of the portable cooking station 100 of FIGS. 1-10 in isolation. FIG. 12 is a right side view of the sear grate 102 of the portable cooking station 100 of FIGS. 1-11 in isolation. FIG. 13 is a left side view of the sear grate 102 of the portable cooking station 100 of FIGS. 1-12 in isolation. FIG. 14 is a top view of the sear grate 102 of the portable cooking station 100 of FIGS. 1-13 in isolation. FIG. 15 is a bottom view of the sear grate 102 of the portable cooking station 100 of FIGS. 1-14 in isolation. FIG. 16 is a cross-section view of the sear grate 102 of the portable cooking station 100 of FIGS. 1-9 in isolation and taken along section B-B of FIG. 14.

In the illustrated example of FIGS. 1-16, the sear grate 102 includes an example central portion 104 having an example upper surface 106 and example lower surface 702 located opposite the upper surface 106 of the central portion 104. The sear grate 102 is configured such that upper surface 106 of the central portion 104 constitutes a surface for searing (e.g., causing sear marks to be applied to) one or more items of food (e.g., a steak, a pork chop, etc.) placed in contact with the upper surface 106 of the central portion 104 when the sear grate 102 is positioned directly on and/or over an underlying heat source (e.g., when the sear grate 102 is docked over and/or across a central opening of a modular grate system of a grill), with the upper surface 106 of the central portion 104 being directed away from the underlying heat source and the lower surface 702 of the central portion 104 being directed toward the underlying heat source.

The sear grate 102 of FIGS. 1-16 further includes an example front end 108, an example rear end 110, an example right side 112, an example left side 114, example straight corners 116, and example rounded corners 118. In the illustrated example of FIGS. 1-16, a first one of the straight corners 116 of the sear grate 102 is formed between the front end 108 and the right side 112 of the sear grate 102. A second one of the straight corners 116 of the sear grate 102 is formed between the rear end 110 and the right side 112 of the sear grate 102. A first one of the rounded corners 118 of the sear grate 102 is formed between the front end 108 and the left side 114 of the sear grate 102. A second one of the rounded corners 118 of the sear grate 102 is formed between the rear end 110 and the left side 114 of the sear grate 102. In other examples, one or more of the straight corners 116 of the sear grate 102 can be configured as a rounded corner, a tapered corner, etc., and/or one or more of the rounded corners 118 of the sear grate 102 can be configured as a straight corner, a tapered corner, etc.

In the illustrated example of FIGS. 1-16, the sear grate 102 has a generally rectangular profile defined by the front end 108, the rear end 110, the right side 112, the left side 114, the straight corners 116, and the rounded corners 118 of the sear grate 102. In other examples, the sear grate 102 can have a non-rectangular profile. For example, the sear grate 102 can have a semicircular profile, a triangular profile, a trapezoidal profile, etc.

The sear grate 102 of FIGS. 1-16 further includes example openings 120 (e.g., through holes) extending through the central portion 104 (e.g., extending through both the upper surface 106 and the lower surface 702 of the central portion 104) of the sear grate 102. Respective ones of the openings 120 are arranged relative to one another in a manner that provides an example sear pattern 122 for the central portion 104 of the sear grate 102. In the illustrated example of FIGS. 1-16, the openings 120 of the sear grate 102 have a diamond-shaped profile. In other examples, the openings 120 of the sear grate 102 can have a non-diamond-shaped profile. For example, the openings 120 of the sear grate 102 can have a rectangular profile, a triangular profile, etc.

The sear grate 102 of FIGS. 1-16 further includes an example interlock pin opening 704 (e.g., a through hole) extending through the central portion 104 (e.g., extending through both the upper surface 106 and the lower surface 702 of the central portion 104) of the sear grate 102. The interlock pin opening 704 of the sear grate 102 is configured to receive an interlock pin of a griddle of the portable cooking station 100, as further described below. In the illustrated example of FIGS. 1-16, the interlock pin opening 704 of the sear grate 102 has a circular profile. In other examples, the interlock pin opening 704 of the sear grate 102 can have a non-circular profile. For example, the interlock pin opening 704 of the sear grate 102 can have an elliptical profile, a triangular profile, a rectangular profile, etc.

The sear grate 102 of FIGS. 1-16 further includes an example lip 124 coupled to and extending upwardly from the central portion 104 of the sear grate 102. In the illustrated example of FIGS. 1-16, the lip 124 of the sear grate 102 is integrally formed with the central portion 104 of the sear grate 102 such that no joints, seams, and/or welds exist between the lip 124 and the central portion 104, and/or such that the lip 124 cannot be removed and/or separated from the central portion 104 absent destructive measures. In other examples, the lip 124 can be coupled to the central portion 104 via one or more permanent, temporary, and/or removable mechanical fasteners(s), adhesive(s), and/or bonding agent(s).

The lip 124 of the sear grate 102 of FIGS. 1-16 includes an example exterior surface 126 and an example interior surface 128 located opposite the exterior surface 126 of the lip 124. The lip 124 of the sear grate 102 is configured such that the interior surface 128 of the lip 124 provides a peripheral boundary for food being cooked on the upper surface 106 of the central portion 104 of the sear grate 102. In the illustrated example of FIGS. 1-16, the profile of the lip 124 has a shape that complements and/or matches the shape of the overall profile of the sear grate 102. In other examples, the profile of the lip 124 can have a shape that does not complement and/or match the shape of the overall profile of the sear grate 102.

In some examples, the lip 124 of the sear grate 102 extends upwardly from the central portion 104 of the sear grate 102 at an angle of ninety degrees relative to an example plane 802 defined by the upper surface 106 of the central portion 104, such that the lip 124 is orthogonal to the central portion 104 and has neither in outward taper nor an inward taper relative thereto. In other examples, the lip 124 of the sear grate 102 can extend upwardly from the central portion 104 of the sear grate 102 at an angle greater than ninety degrees relative to the plane 802, such that the lip 124 has an outward taper as it extends upwardly away from the central portion 104. In still examples, the lip 124 of the sear grate 102 can extend upwardly from the central portion 104 of the sear grate 102 at an angle less than ninety degrees relative to the plane 802, such that the lip 124 has an inward taper as it extends upwardly away from the central portion 104.

The lip 124 of the sear grate 102 of FIGS. 1-16 further includes and/or forms example interlock tab guides 130. The interlock tab guides 130 of the sear grate 102 are individually and/or collectively configured to guide an interlock tab of a griddle of the portable cooking station 100 into a position relative to the sear grate 102 that facilitates interlocking, connecting, and/or otherwise coupling the griddle to the sear grate 102, as further described below. In the illustrated example of FIGS. 1-16, the lip 124 of the sear grate 102 includes two interlock tab guides 130. In other examples, the lip 124 of the sear grate 102 can include a different number (e.g. 1, 3, 4, etc.) of interlock tab guides 130.

The sear grate 102 of FIGS. 1-16 further includes example feet 202 coupled to and extending downwardly from the lower surface 702 of the central portion 104 of the sear grate 102. In the illustrated example of FIGS. 1-16, the feet 202 of the sear grate 102 are integrally formed with the central portion 104 of the sear grate 102 such that no joints, seams, and/or welds exist between the feet 202 and the central portion 104, and/or such that the feet 202 cannot be removed and/or separated from the central portion 104 absent destructive measures. In other examples, the feet 202 can be coupled to the central portion 104 via one or more permanent, temporary, and/or removable mechanical fasteners(s), adhesive(s), and/or bonding agent(s).

The feet 202 of the sear grate 102 of FIGS. 1-16 are configured to contact an underlying support surface (e.g., a countertop, a tabletop, etc.) such that the lower surface 702 of the central portion 104 of the sear grate 102 is raised above and/or off of the underlying support surface when the sear grate 102 is positioned thereon. The feet 202 of the sear grate 102 of FIGS. 1-16 are additionally configured to guide, locate, position, and/or dock the sear grate 102 and/or, more generally, the portable cooking station 100 relative to an opening of a modular grate system, as further described below. In the illustrated example of FIGS. 1-16, the sear grate 102 includes four feet 202. In other examples, the sear grate 102 can include a different number (e.g. 1, 2, 3, etc.) of feet 202. In the illustrated example of FIGS. 1-16, some of the feet 202 of the sear grate 102 have a cylindrical shape, and others of the feet 202 of the sear grate 102 have a rectangular cuboidal shape. In other examples, one or more of the feet 202 can have a non-cylindrical shape and/or a non-rectangular-cuboidal shape. For example, one or more of the feet 202 can have a spherical shape, a conical shape, a pyramidal shape, etc.

Figure 17:
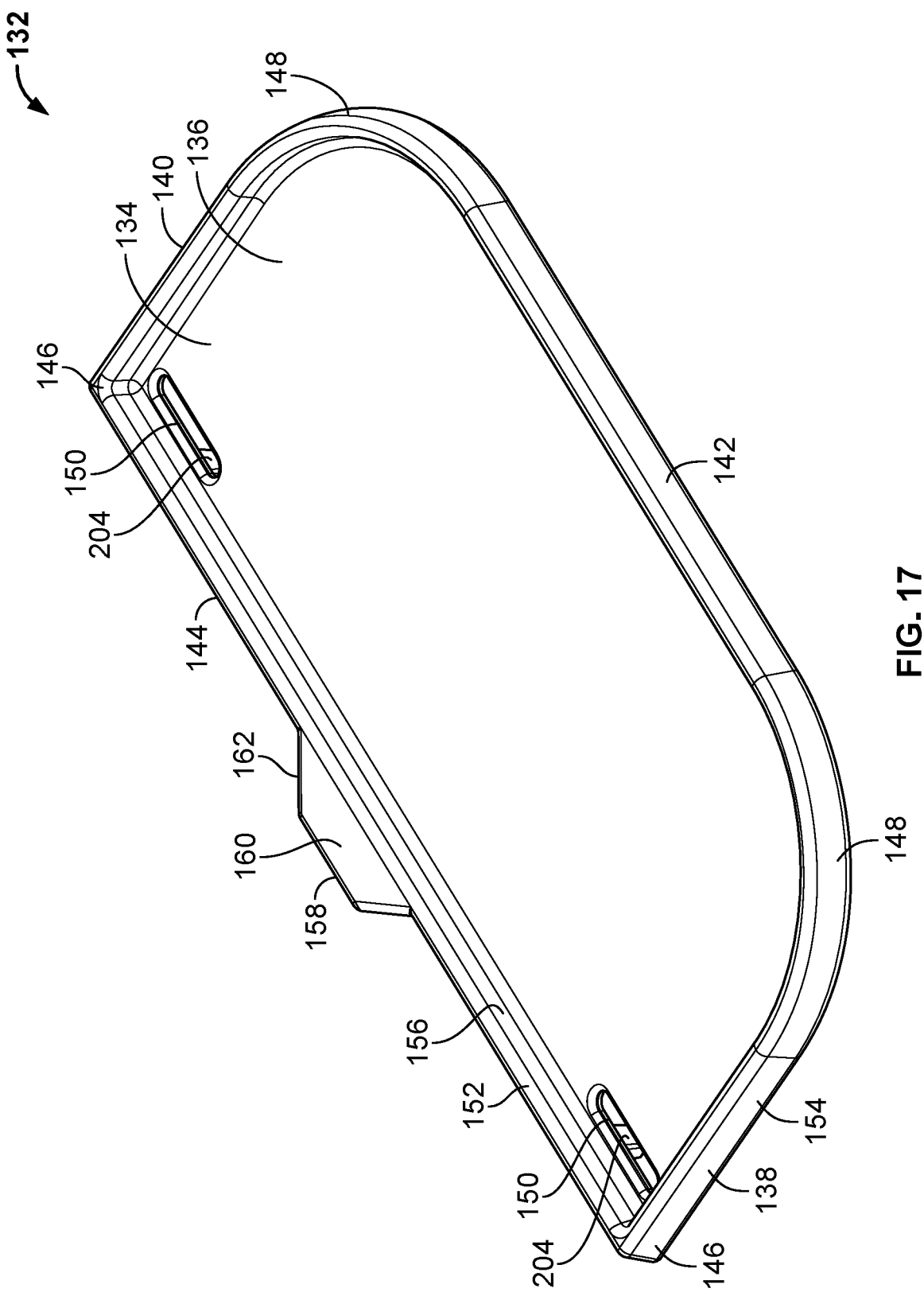
FIG. 17 is a perspective view of the griddle of the portable cooking station of FIGS. 1-8 in isolation.
Figure 18:
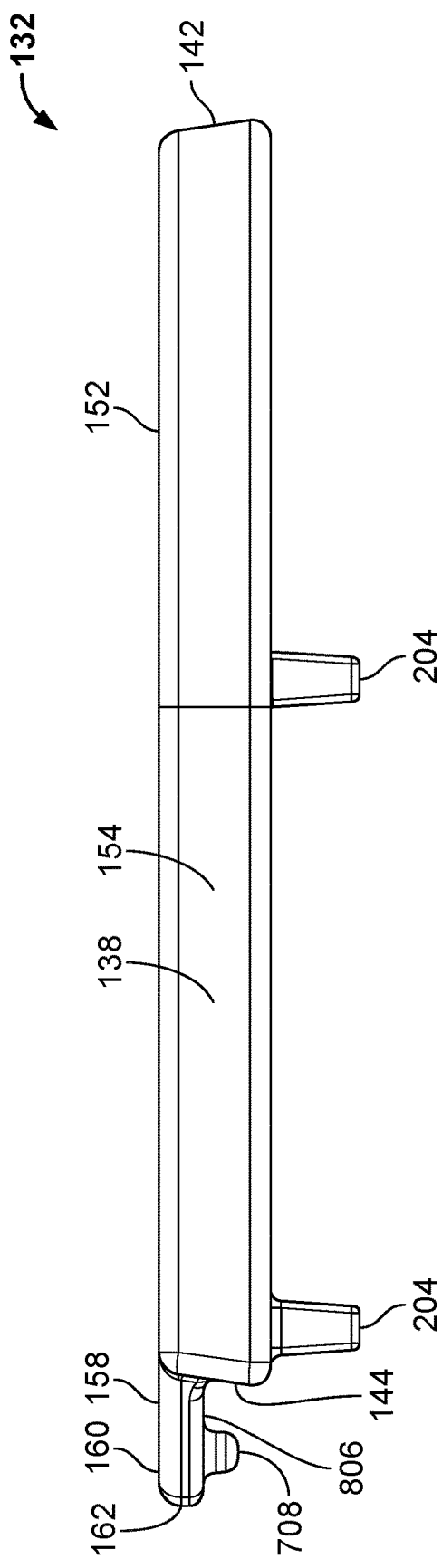
FIG. 18 is a front view of the griddle of the portable cooking station of FIGS. 1-8 and 17 in isolation.
Figure 19:
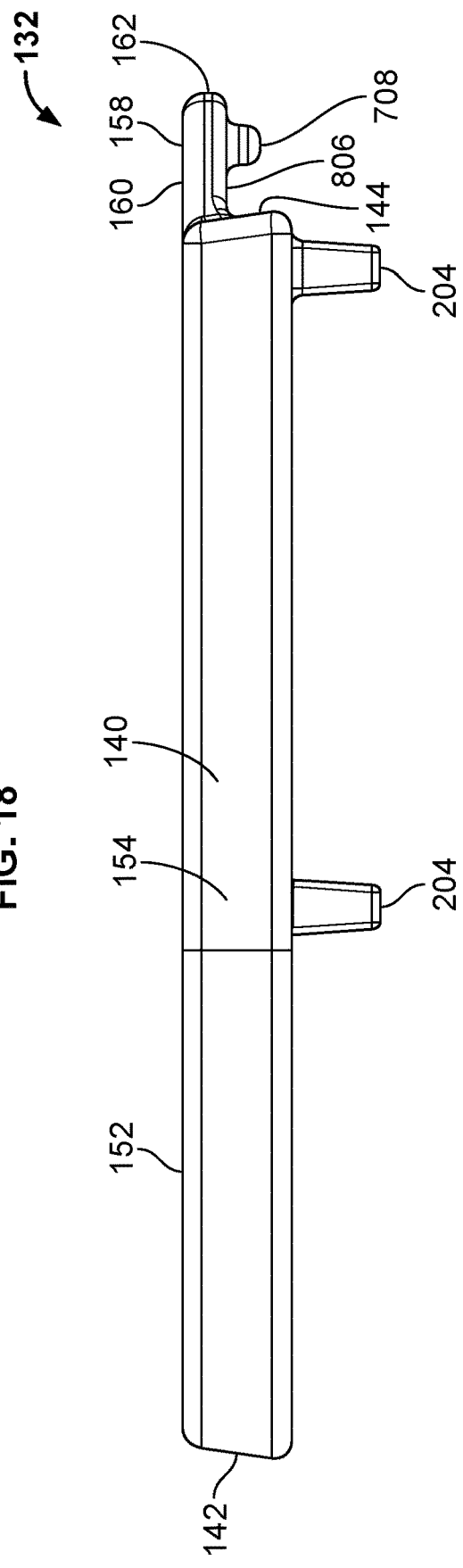
FIG. 19 is a rear view of the griddle of the portable cooking station of FIGS. 1-8, 17, and 18 in isolation.
Figure 20:
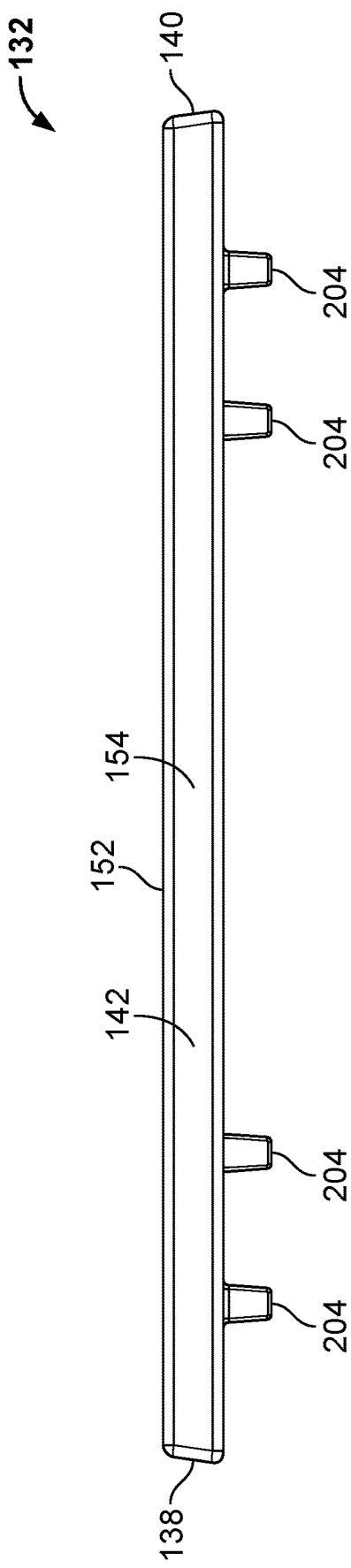
FIG. 20 is a right side view of the griddle of the portable cooking station of FIGS. 1-8 and 17-19 in isolation.
Figure 21:
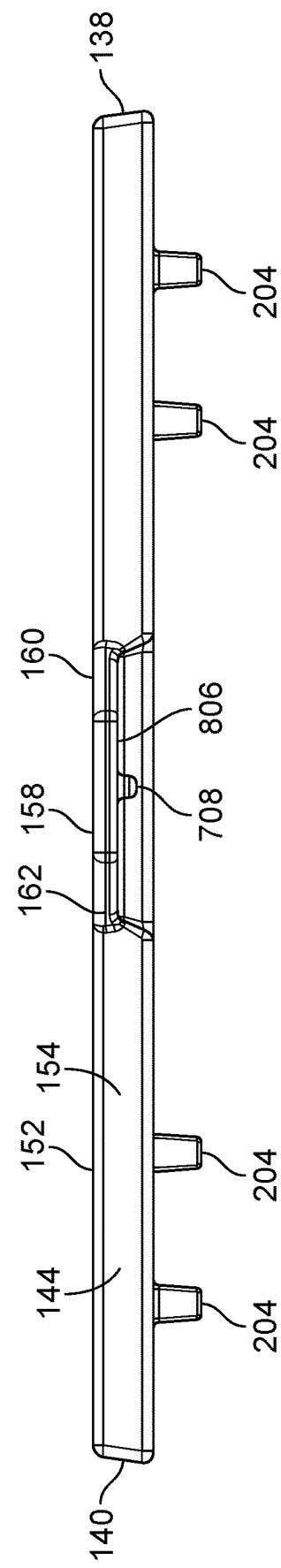
FIG. 21 is a left side view of the griddle of the portable cooking station of FIGS. 1-8 and 17-20 in isolation.
Figure 22:
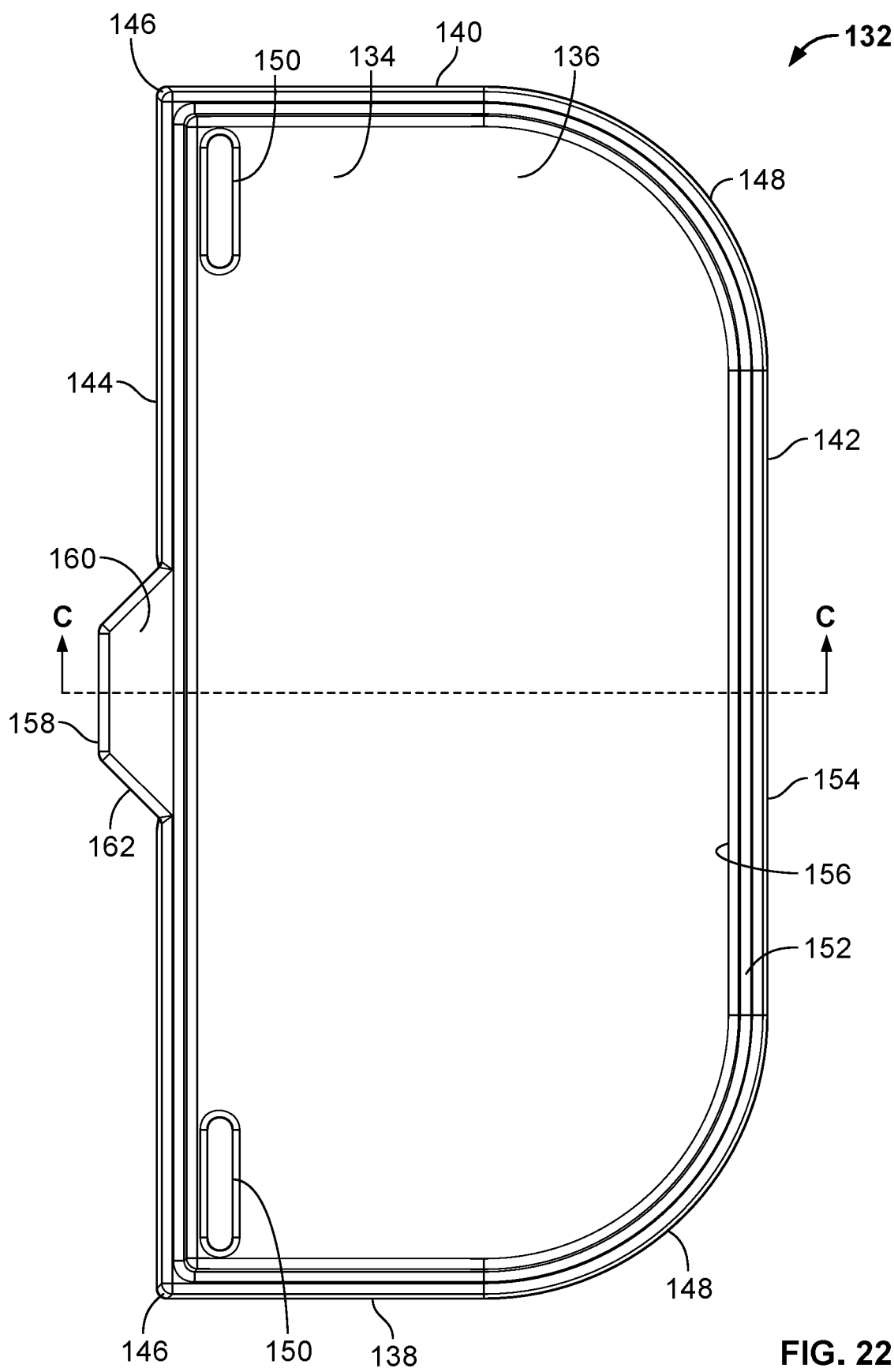
FIG. 22 is a top view of the griddle of the portable cooking station of FIGS. 1-8 and 17-21 in isolation.
Figure 23:
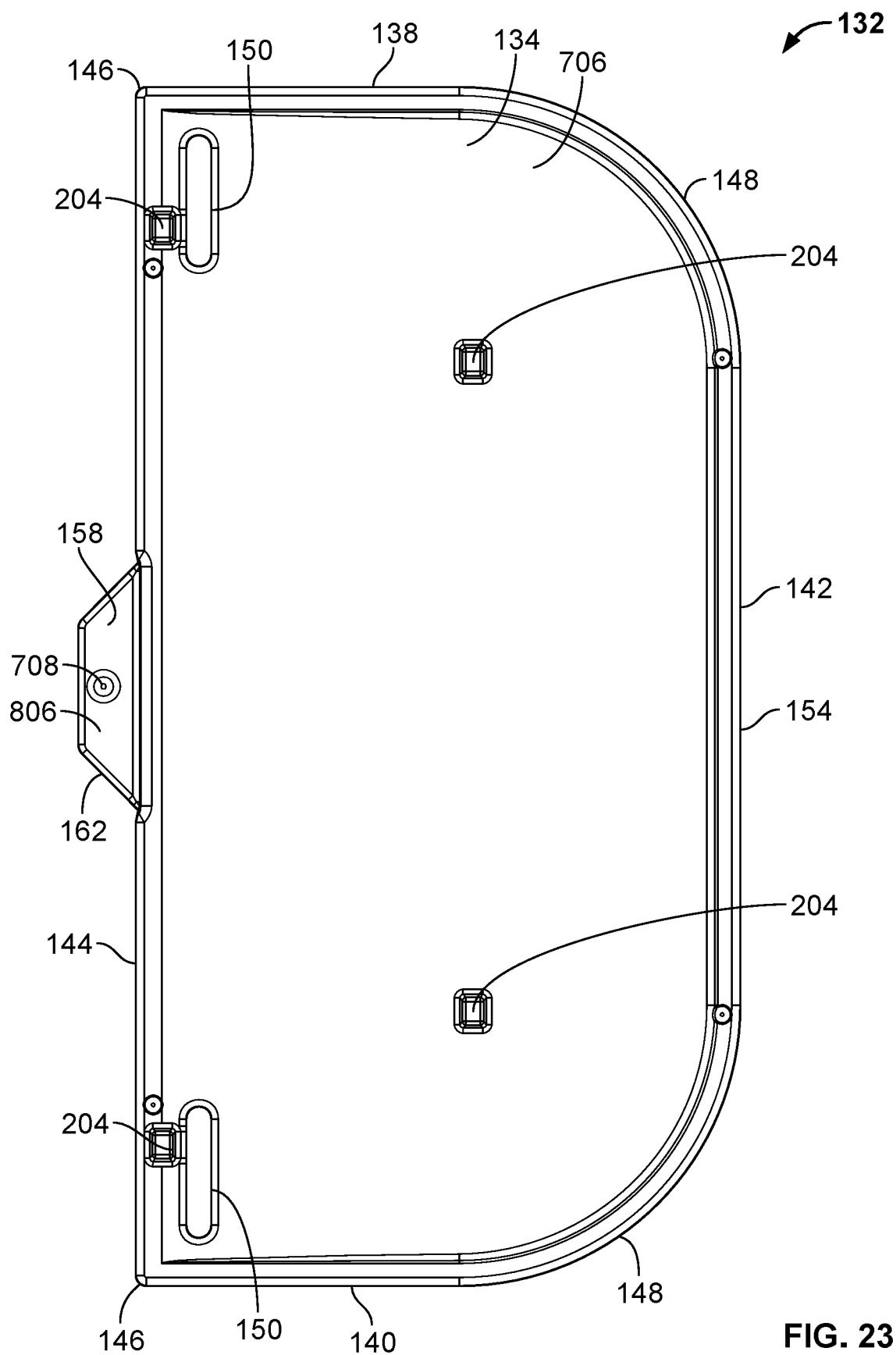
FIG. 23 is a bottom view of the griddle of the portable cooking station of FIGS. 1-8 and 17-22 in isolation.
Figure 24:
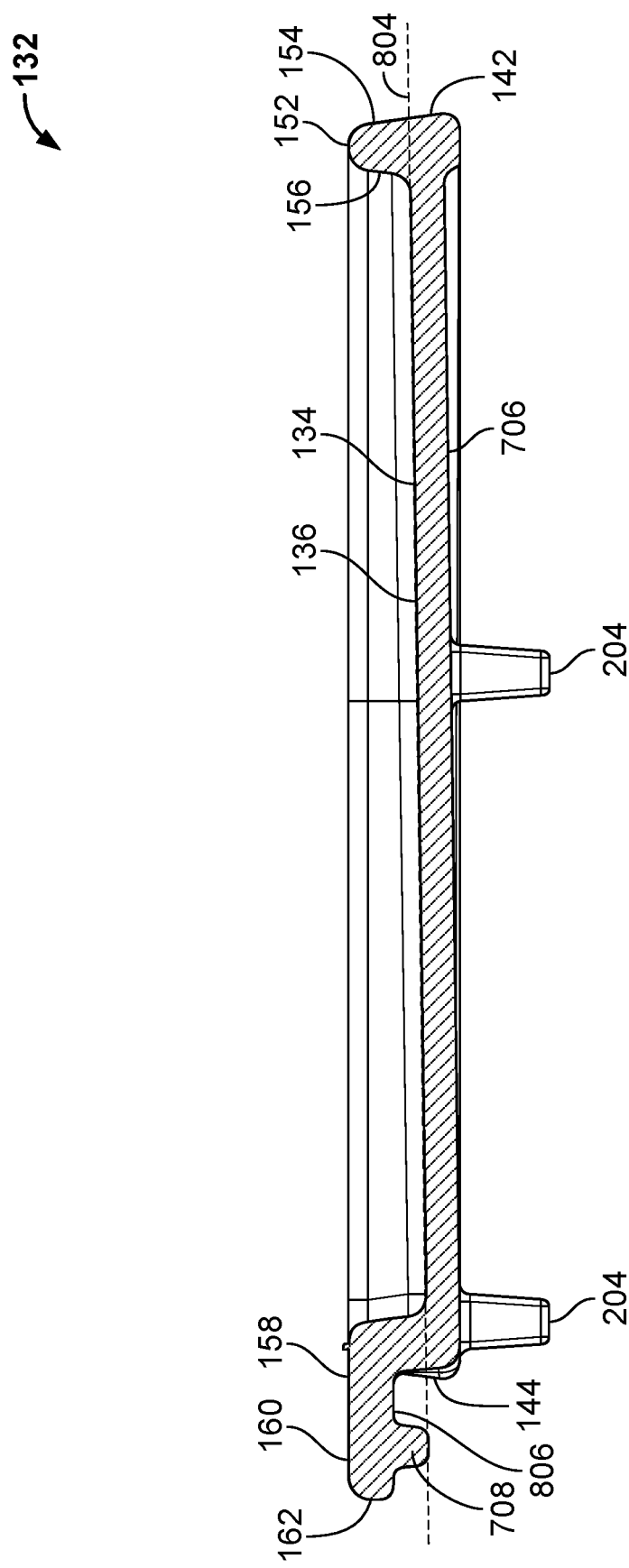
FIG. 24 is a cross-section view of the griddle of the portable cooking station of FIGS. 1-8 and 17-23 in isolation and taken along section C-C of FIG. 21.

The portable cooking station 100 of FIGS. 1-8 further includes an example griddle 132. FIG. 17 is a perspective view of the griddle 132 of the portable cooking station 100 of FIGS. 1-8 in isolation. FIG. 18 is a front view of the griddle 132 of the portable cooking station 100 of FIGS. 1-8 and 17 in isolation. FIG. 19 is a rear view of the griddle 132 of the portable cooking station 100 of FIGS. 1-8, 17, and 18 in isolation. FIG. 20 is a right side view of the griddle 132 of the portable cooking station 100 of FIGS. 1-8 and 17-19 in isolation. FIG. 21 is a left side view of the griddle 132 of the portable cooking station 100 of FIGS. 1-8 and 17-20 in isolation. FIG. 22 is a top view of the griddle 132 of the portable cooking station 100 of FIGS. 1-8 and 17-21 in isolation. FIG. 23 is a bottom view of the griddle 132 of the portable cooking station 100 of FIGS. 1-8 and 17-22 in isolation. FIG. 24 is a cross-section view of the griddle 132 of the portable cooking station 100 of FIGS. 1-8 and 17-23 in isolation and taken along section C-C of FIG. 22.

In the illustrated example of FIGS. 1-8 and 17-24, the griddle 132 includes an example central portion 134 having an example upper surface 136 and example lower surface 706 located opposite the upper surface 136 of the central portion 134. The griddle 132 is configured such that upper surface 136 of the central portion 134 constitutes a smooth, flat surface for cooking one or more items of food (e.g., eggs, pancakes, bacon, vegetables, etc.) placed in contact with the upper surface 136 of the central portion 134 when the griddle 132 is positioned directly on and/or over an underlying heat source (e.g., when the griddle 132 is docked over and/or across a central opening of a modular grate system of a grill), with the upper surface 136 of the central portion 134 being directed away from the underlying heat source and the lower surface 706 of the central portion 134 being directed toward the underlying heat source.

The griddle 132 of FIGS. 1-8 and 17-24 further includes an example front end 138, an example rear end 140, an example right side 142, an example left side 144, example straight corners 146, and example rounded corners 148. In the illustrated example of FIGS. 1-8 and 17-24, a first one of the straight corners 146 of the griddle 132 is formed between the front end 138 and the left side 144 of the griddle 132. A second one of the straight corners 146 of the griddle 132 is formed between the rear end 140 and the left side 144 of the griddle 132. A first one of the rounded corners 148 of the griddle 132 is formed between the front end 138 and the right side 142 of the griddle 132. A second one of the rounded corners 148 of the griddle 132 is formed between the rear end 140 and the right side 142 of the griddle 132. In other examples, one or more of the straight corners 146 of the griddle 132 can be configured as a rounded corner, a tapered corner, etc., and/or one or more of the rounded corners 148 of the griddle 132 can be configured as a straight corner, a tapered corner, etc.

In the illustrated example of FIGS. 1-8 and 17-24, the griddle 132 has a generally rectangular profile defined by the front end 138, the rear end 140, the right side 142, the left side 144, the straight corners 146, and the rounded corners 148 of the griddle 132. In other examples, the griddle 132 can have a non-rectangular profile. For example, the griddle 132 can have a semicircular profile, a triangular profile, a trapezoidal profile, etc. In the illustrated example of FIGS. 1-8, the profile of the griddle 132 has a shape that complements and/or matches the shape of the profile of the sear grate 102, with the profile of the griddle 132 mirroring the profile of the sear grate 102. In other examples, the profile of the griddle 132 can have a shape that does not complement and/or match the shape of the profile of the sear grate 102.

The upper surface 136 of the central portion 134 of the griddle 132 defines an example plane 804. In the illustrated example of FIGS. 1-8 and 17-24, the plane 804 has a sloped orientation with a relatively higher area proximate the right side 142 of the griddle 132 and a relatively lower area proximate the left side 144 of the griddle 132. The upper surface 136 of the central portion 134 of the griddle 132 accordingly slopes downward moving from the right side 142 of the griddle 132 toward and/or to the left side 144 of the griddle 132. When the griddle 132 is interlocked, connected, and/or otherwise coupled to the sear grate 102 (e.g., as shown in FIGS. 1-8), the plane 804 defined by the upper surface 136 of the central portion 134 of the griddle 132 is accordingly sloped and/or angled relative to the plane 802 defined by the upper surface 106 of the central portion 104 of the sear grate 102. In other examples, the plane 804 can have a sloped orientation with a relatively higher area proximate the left side 144 of the griddle 132 and a relatively lower area proximate the right side 142 of the griddle 132. In still other examples, the plane 804 can have a sloped orientation with a relatively higher area proximate the front end 138 of the griddle 132 and a relatively lower area proximate the rear end 140 of the griddle 132. In still other examples, the plane 804 can have a sloped orientation with a relatively higher area proximate the rear end 140 of the griddle 132 and a relatively lower area proximate the front end 138 of the griddle 132. In still other examples, the plane 804 can have a non-sloped orientation.

The griddle 132 of FIGS. 1-8 and 17-24 further includes example openings 150 (e.g., through holes) extending through the central portion 134 (e.g., extending through both the upper surface 136 and the lower surface 706 of the central portion 134) of the griddle 132. The openings 150 constitute drains that enable liquid byproducts (e.g., grease, juice, water, etc.) produced by one or more items of food being cooked on the upper surface 136 of the central portion 134 of the griddle 132 to be removed from the griddle 132, which advantageously prevents the pooling of such liquid byproducts thereon. In the illustrated example of FIGS. 1-8 and 17-24, the openings 150 are located proximate the left side 144 of the griddle 132, at a lower area of the sloped upper surface 136 of the central portion 134. The above-described location of the openings 150 advantageously enables liquid byproducts to naturally (e.g., via gravity) run down the sloped upper surface 136 of the central portion 134 of the griddle 132 (e.g., from a higher area of the sloped upper surface 136 of the central portion 134 proximate the right side 142 of the griddle 132) toward, into, and/or through the openings 150. In other examples, the openings 150 of the griddle 132 can be located at different areas and/or positions of the central portion 134 of the griddle 132 relative to those shown in FIGS. 1-8 and 17-24.

In the illustrated example of FIGS. 1-8 and 17-24, the griddle 132 includes two openings 150. In other examples, the griddle 132 can include a different number (e.g. 1, 3, 4 etc.) of openings 150. In the illustrated example of FIGS. 1-8 and 17-24, the openings 150 of the griddle 132 have a generally rectangular profile including rounded corners. In other examples, the openings 150 of the griddle 132 can have a non-rectangular profile. For example, the openings 150 of the griddle 132 can have a circular profile, an elliptical profile, a triangular profile, etc.

The griddle 132 of FIGS. 1-8 and 17-24 further includes an example lip 152 coupled to and extending upwardly from the central portion 134 of the griddle 132. In the illustrated example of FIGS. 1-8 and 17-24, the lip 152 of the griddle 132 is integrally formed with the central portion 134 of the griddle 132 such that no joints, seams, and/or welds exist between the lip 152 and the central portion 134, and/or such that the lip 152 cannot be removed and/or separated from the central portion 134 absent destructive measures. In other examples, the lip 152 can be coupled to the central portion 134 via one or more permanent, temporary, and/or removable mechanical fasteners(s), adhesive(s), and/or bonding agent(s).

The lip 152 of the griddle 132 of FIGS. 1-8 and 17-24 includes an example exterior surface 154 and an example interior surface 156 located opposite the exterior surface 154 of the lip 152. The lip 152 of the griddle 132 is configured such that the interior surface 156 of the lip 152 provides a peripheral boundary for food being cooked on the upper surface 136 of the central portion 134 of the griddle 132. In the illustrated example of FIGS. 1-8 and 17-24, the profile of the lip 152 has a shape that complements and/or matches the shape of the overall profile of the griddle 132. In other examples, the profile of the lip 152 can have a shape that does not complement and/or match the shape of the overall profile of the griddle 132.

In some examples, the lip 152 of the griddle 132 extends upwardly from the central portion 134 of the griddle 132 at an angle of ninety degrees relative to the plane 804 defined by the upper surface 136 of the central portion 134, such that the lip 152 is orthogonal to the central portion 134 and has neither in outward taper nor an inward taper relative thereto. In other examples, the lip 152 of the griddle 132 can extend upwardly from the central portion 134 of the griddle 132 at an angle greater than ninety degrees relative to the plane 804, such that the lip 152 has an outward taper as it extends upwardly away from the central portion 134. In still examples, the lip 152 of the griddle 132 can extend upwardly from the central portion 134 of the griddle 132 at an angle less than ninety degrees relative to the plane 804, such that the lip 152 has an inward taper as it extends upwardly away from the central portion 134.

The griddle 132 of FIGS. 1-8 and 17-24 further includes an example interlock tab 158 coupled to and extending outwardly from the lip 152 of the griddle 132. In the illustrated example of FIGS. 1-8 and 17-24, the interlock tab 158 of the griddle 132 is integrally formed with the lip 152 of the griddle 132 such that no joints, seams, and/or welds exist between the interlock tab 158 and the lip 152, and/or such that the interlock tab 158 cannot be removed and/or separated from the lip 152 absent destructive measures. In other examples, the interlock tab 158 can be coupled to the lip 152 via one or more permanent, temporary, and/or removable mechanical fasteners(s), adhesive(s), and/or bonding agent(s).

The interlock tab 158 of the griddle 132 of FIGS. 1-8 and 17-24 includes an example upper surface 160, an example lower surface 806 located opposite the upper surface 160 of the interlock tab 158, and an example outer edge 162 located between the upper surface 160 and the lower surface 806 of the interlock tab 158. The interlock tab 158 is configured such that, when the griddle 132 of the portable cooking station 100 is interlocked, connected, and/or otherwise coupled to the sear grate 102 of the portable cooking station 100, the upper surface 160 of the interlock tab 158 faces away from the sear grate 102, the lower surface 806 of the interlock tab 158 faces toward the sear grate 102, and the outer edge 162 of the interlock tab 158 faces toward, abuts, and/or contacts the interlock tab guides 130 of the sear grate 102. In the illustrated example of FIGS. 1-8 and 17-24, the interlock tab 158 has a trapezoidal profile. In other examples, the interlock tab 158 can have a non-trapezoidal profile. For example, the interlock tab 158 can have a circular profile, an elliptical profile, a triangular profile, a rectangular profile, a pentagonal profile, a hexagonal profile, etc.

The griddle 132 of FIGS. 1-8 and 17-24 further includes an example interlock pin 708 coupled to and extending downwardly from the interlock tab 158 of the griddle 132. In the illustrated example of FIGS. 1-8 and 17-24, the interlock pin 708 of the griddle 132 is integrally formed with the interlock tab 158 of the griddle 132 such that no joints, seams, and/or welds exist between the interlock pin 708 and the interlock tab 158, and/or such that the interlock pin 708 cannot be removed and/or separated from the interlock tab 158 absent destructive measures. In other examples, the interlock pin 708 can be coupled to the interlock tab 158 via one or more permanent, temporary, and/or removable mechanical fasteners(s), adhesive(s), and/or bonding agent(s).

The interlock pin 708 of the griddle 132 of FIGS. 1-8 and 17-24 assists with interlocking, connecting, and/or otherwise coupling the griddle 132 of the portable cooking station 100 to the sear grate 102 of the portable cooking station 100. In this regard, the interlock pin 708 of the griddle 132 is configured such that, when the griddle 132 of the portable cooking station 100 is interlocked, connected, and/or otherwise coupled to the sear grate 102 of the portable cooking station 100, the interlock pin 708 of the griddle 132 is inserted into and/or positioned within the interlock pin opening 704 of the sear grate 102. Insertion of the interlock pin 708 of the griddle 132 into the interlock pin opening 704 prevents lateral movement between the interlocked griddle 132 and sear grate 102. In the illustrated example of FIGS. 1-8 and 17-24, the interlock pin 708 has a circular profile. In other examples, the interlock pin 708 can have a non-circular profile. For example, the interlock pin 708 can have an elliptical profile, a triangular profile, a rectangular profile, a trapezoidal profile, a pentagonal profile, a hexagonal profile, etc.

The griddle 132 of FIGS. 1-8 and 17-24 further includes example feet 204 coupled to and extending downwardly from the lower surface 706 of the central portion 134 of the griddle 132. In the illustrated example of FIGS. 1-8 and 17-24, the feet 204 of the griddle 132 are integrally formed with the central portion 134 of the griddle 132 such that no joints, seams, and/or welds exist between the feet 204 and the central portion 134, and/or such that the feet 204 cannot be removed and/or separated from the central portion 134 absent destructive measures. In other examples, the feet 204 can be coupled to the central portion 134 via one or more permanent, temporary, and/or removable mechanical fasteners(s), adhesive(s), and/or bonding agent(s).

The feet 204 of the griddle 132 of FIGS. 1-8 and 17-24 are configured to contact an underlying support surface (e.g., a countertop, a tabletop, etc.) such that the lower surface 706 of the central portion 134 of the griddle 132 is raised above and/or off of the underlying support surface when the griddle 132 is positioned thereon. The feet 204 of the griddle 132 of FIGS. 1-8 and 17-24 are additionally configured to guide, locate, position, and/or dock the griddle 132 and/or, more generally, the portable cooking station 100 relative to an opening of a modular grate system, as further described below. In the illustrated example of FIGS. 1-8 and 17-24, the griddle 132 includes four feet 204. In other examples, the griddle 132 can include a different number (e.g. 1, 2, 3, etc.) of feet 204. In the illustrated example of FIGS. 1-8 and 17-24, the feet 204 of the griddle 132 have a rectangular cuboidal shape. In other examples, one or more of the feet 204 can have a non-rectangular-cuboidal shape. For example, one or more of the feet 204 can have a spherical shape, a cylindrical shape, a conical shape, a pyramidal shape, etc.

The griddle 132 of the portable cooking station 100 can be removably interlocked, connected, and/or otherwise coupled to the sear grate 102 of the portable cooking station 100 in a side-by-side arrangement, as generally shown in FIGS. 1-8. When the griddle 132 is interlocked, connected, and/or coupled to the sear grate 102, the left side 144 of the griddle 132 faces toward, abuts, and/or contacts the right side 112 of the sear grate 102, and the straight corners 146 of the griddle 132 are oriented toward the straight corners 116 of the sear grate 102. Interlocking, connecting, and/or otherwise coupling the griddle 132 to the sear grate 102 in the side-by-side arrangement shown in FIGS. 1-8 can be facilitated by inserting the interlock pin 708 of the griddle 132 into the interlock pin opening 704 of the sear grate 102, with such insertion being guided by the outer edge 162 of the interlock tab 158 of the griddle 132 and the interlock tab guides 130 of the sear grate 102. When the sear grate 102, the griddle 132, and/or, more generally, the portable cooking station 100 are not in use, the griddle 132 can be unlocked, unconnected, and/or otherwise uncoupled from the sear grate 102 by removing the interlock pin 708 of the griddle 132 from the interlock pin opening 704 of the sear grate 102. Once the griddle 132 has been unlocked, unconnected, and/or otherwise uncoupled from the sear grate 102, the griddle 132 and the sear grate 102 can be placed in a face-to-face arrangement relative to one another (e.g., with the upper surface 136 of the central portion 134 of the griddle 132 facing toward the upper surface 106 of the central portion 104 of the sear grate 102). Placing the griddle 132 and the sear grate 102 in a face-to face arrangement relative to one another reduces the overall footprint of the portable cooking station 100, which can be advantageous for transporting, cleaning, and/or storing the portable cooking station 100.

In some examples, the above-described relationship between the interlock pin opening 704 and the interlock tab guides 130 of the sear grate 102 on the one hand and the interlock pin 708 and the interlock tab 158 of the griddle 132 on the other hand can be modified and/or reversed. For example, the portable cooking station 100 can alternatively be configured such that the sear grate 102 includes the interlock pin 708 and the interlock tab 158, and the griddle 132 includes the interlock pin opening 704 and the interlock tab guides 130. As another example, the portable cooking station 100 can alternatively be configured to include multiple instances and/or implementations of the above-described interlock structures (e.g., two interlock pin openings 704, two sets of interlock tab guides 130, two interlock pins 708, and two interlock tabs 158).

In some examples, the sear grate 102 of FIGS. 1-16 can include one or more additional structure(s) and/or component(s) beyond those shown and described in connection with FIGS. 1-16. In other examples, the sear grate 102 can omit one or more structure(s) and/or component(s) relative to those shown and described in connection with FIGS. 1-16. In some examples, the griddle 132 of FIGS. 1-8 and 17-24 can include one or more additional structure(s) and/or component(s) beyond those shown and described in connection with FIGS. 1-8 and 17-24. In other examples, the griddle 132 can omit one or more structure(s) and/or component(s) relative to those shown and described in connection with FIGS. 1-8 and 17-24. The portable cooking station 100 of FIGS. 1-8 can include one or more additional structure(s) and/or component(s) beyond those shown and described in connection with FIGS. 1-8. In still other examples, the portable cooking station 100 can omit one or more structure(s) and/or component(s) relative to those shown and described in connection with FIGS. 1-8.

Figure 25:
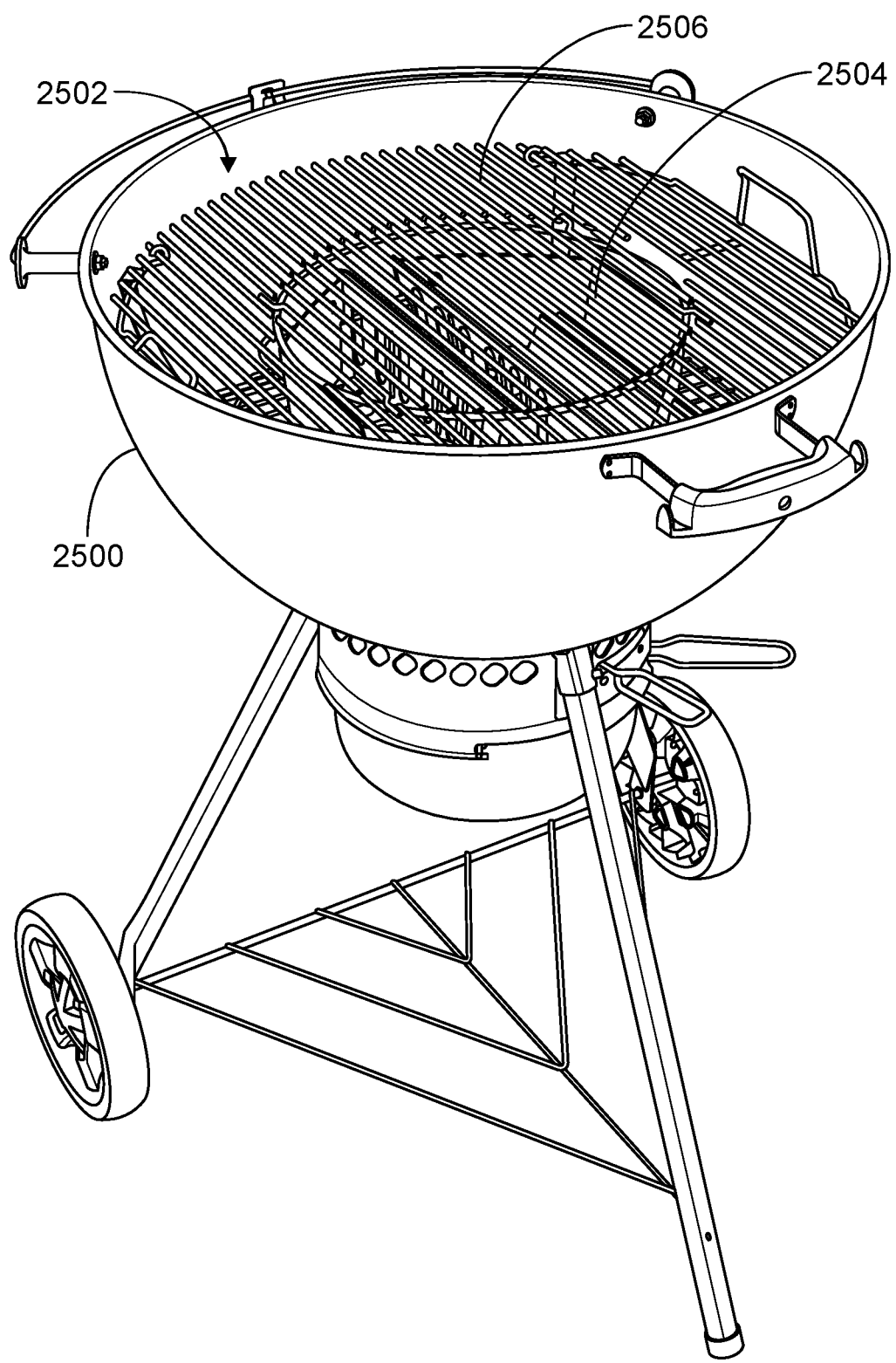
FIG. 25 is a perspective view of an example cooking apparatus having an example modular grate system.

FIG. 25 is a perspective view of an example cooking apparatus 2500 having an example modular grate system 2502. The cooking apparatus 2500 of FIG. 25 is a grill (e.g., a charcoal-fueled grill, a gas-fueled grill, a pellet-fueled grill, etc.) The modular grate system 2502 of FIG. 25 includes an example central grate 2504 circumscribed and/or bounded by one or more example peripheral grates 2506. In the illustrated example of FIG. 25, the central grate 2504 of the modular grate system 2502 has a circular profile. In other examples, the central grate 2504 of the modular grate system 2502 can have a non-circular profile. For example, the central grate 2504 of the modular grate system 2502 can have an elliptical profile, a triangular profile, a rectangular profile, a pentagonal profile, a hexagonal profile, etc.

Figure 26:
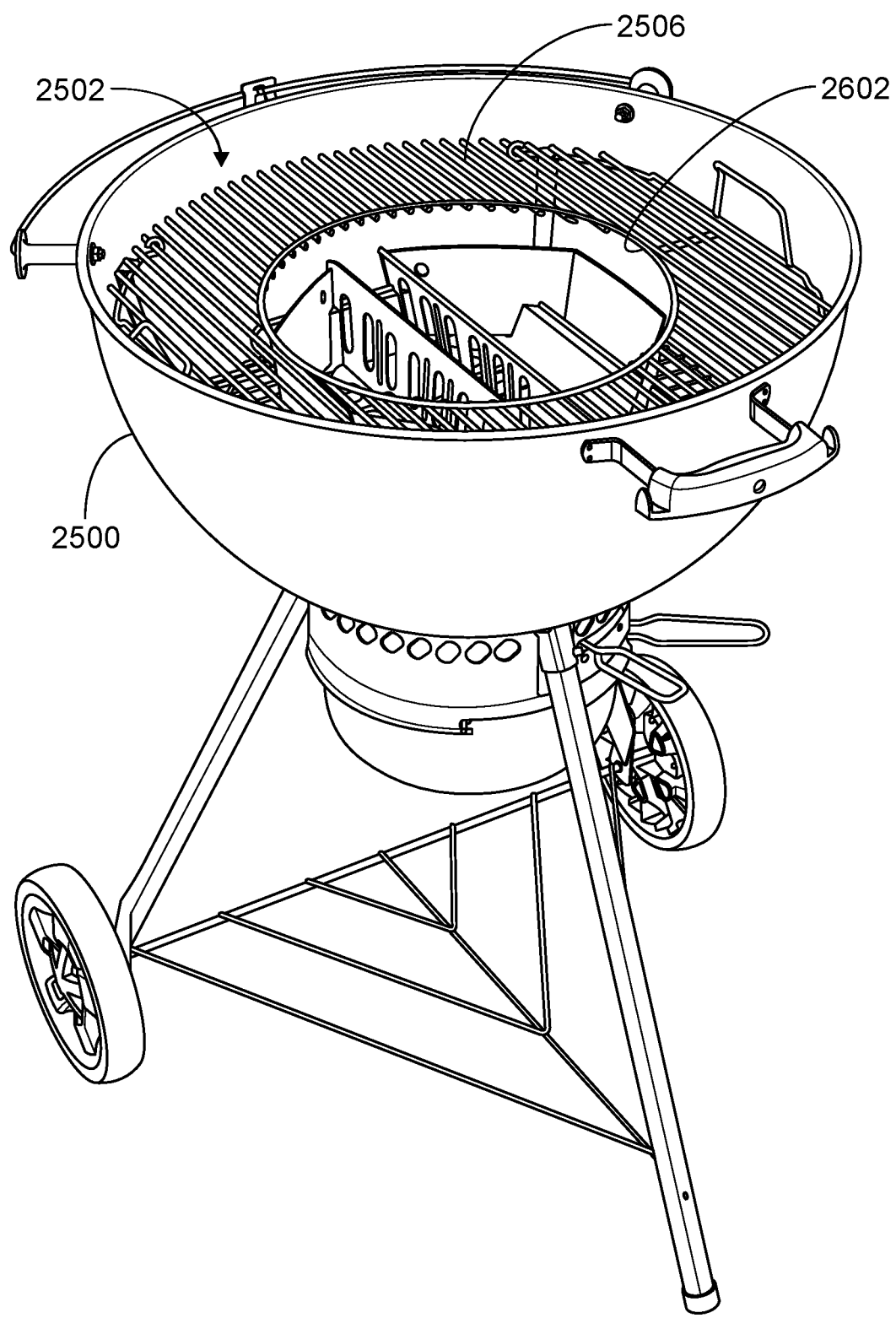
FIG. 26 is a perspective view of the cooking apparatus of FIG. 25 with the central grate of the modular grate system of FIG. 25 removed.

The modular grate system 2502 of FIG. 25 is configured such that the central grate 2504 is removably positioned, seated, and/or docked on the peripheral grate(s) 2506. FIG. 26 is a perspective view of the cooking apparatus of FIG. 25 with the central grate 2504 of the modular grate system 2502 of FIG. 25 removed. Removal of the central grate 2504 from the peripheral grate(s) 2506 results in an example central opening 2602 of the peripheral grate(s) 2506 being exposed. The central opening 2602 is configured to be selectively filled and/or selectively covered by various cooking accessories (e.g., a pizza stone, a wok, etc.), each of which is configured to be removably positioned, seated, and/or docked on the peripheral grate(s) 2506.

Figure 27:
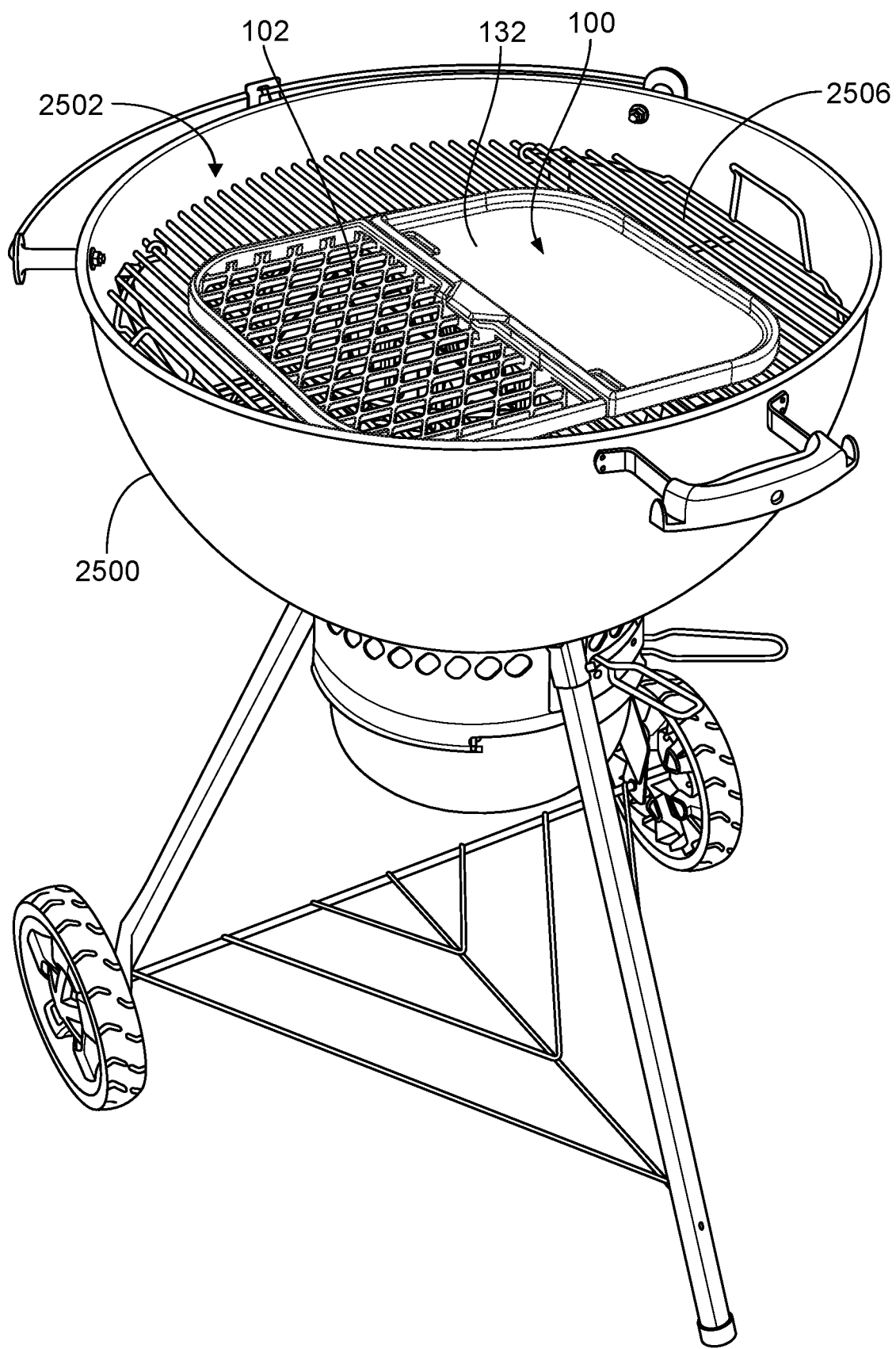
FIG. 27 is a perspective view of the portable cooking station of FIGS. 1-8 docked in the central opening of the modular grate system of FIGS. 25 and 26.

The portable cooking station 100 of FIGS. 1-8 is configured to be used is connection with the modular grate system 2502 of FIGS. 25 and 26, and vice-versa. For example, FIG. 27 is a perspective view of the portable cooking station 100 of FIGS. 1-8 docked in the central opening 2602 of the modular grate system 2502 of FIGS. 25 and 26. In the illustrated example of FIG. 27, the central grate 2602 of the modular grate system 2502 has been removed from the peripheral grate(s) 2506 of the modular grate system 2502. The central opening 2602 that would otherwise be exposed in response to the removal of the central grate 2504 is covered by the sear grate 102 and the griddle 132 of the portable cooking station 100. The feet 202 of the sear grate 102 and the feet 204 of the griddle 132 of the portable cooking station 100 guide, locate, position, and/or dock the sear grate 102 and the griddle 132, and/or, more generally, the portable cooking station 100 relative to the central opening 2602 such that the sear grate 102 and the griddle 132, and/or, more generally, the portable cooking station 100 is/are not slidable (e.g., along the cooking surface(s) of the peripheral grate(s) 2506) relative to the central opening 2602.

From the foregoing, it will be appreciated that example portable cooking stations disclosed herein include interlocking sear grates and griddles. In some examples, portable cooking stations disclosed herein include a sear grate and a griddle, with the griddle being configured to be interlocked to the sear grate in a side-by-side arrangement. The side-by-side arrangement of the sear grate and the griddle of the portable cooking station advantageously enables one food item to be cooked on the sear grate while another food item is being cooked on the griddle. The side-by-side arrangement of the sear grate and the griddle of the portable cooking station also advantageously enables one food item to be cooked on the sear grate at a first time and another food item to be cooked on the griddle at a second time (e.g., prior to or subsequent to the first time) without the need for changing out separate cooking stations (e.g., a griddle independent from the sear grate) relative to a central opening of a modular grate system at which the portable cooking station is docked.

When the disclosed portable cooking station is not in use, the griddle can be unlocked from the sear grate and subsequently positioned in a face-to-face arrangement (e.g., as opposed to the above-described interlocked side-by-side arrangement) relative to the sear grate. Placing the griddle and the sear grate in a face-to face arrangement relative to one another reduces the overall footprint of the portable cooking station, which can be advantageous for transporting, cleaning, and/or storing the portable cooking station.

In some examples, a portable cooking station is disclosed. In some disclosed examples, the portable cooking station comprises a sear grate and a griddle. In some disclosed examples, the griddle is configured to be removably interlocked to the sear grate in a side-by-side arrangement.

In some disclosed examples, the sear grate includes a central portion having an upper surface, a lower surface located opposite the upper surface, and a sear pattern formed by openings extending through the upper surface and the lower surface.

In some disclosed examples, the sear grate includes an interlock pin opening configured to receive an interlock pin of the griddle.

In some disclosed examples, the sear grate includes a lip coupled to and extending upwardly from the central portion of the sear grate.

In some disclosed examples, the lip of the sear grate includes an interlock tab guide configured to guide an interlock tab of the griddle into a position that facilitates interlocking the griddle to the sear grate.

In some disclosed examples, the sear grate includes feet coupled to and extending downwardly from the central portion of the sear grate. In some disclosed examples, the feet are configured to be located within a central opening of a modular grate system when the portable cooking station is docked on the modular grate system.

In some disclosed examples, the griddle includes a central portion having an upper surface and a lower surface located opposite the upper surface.

In some disclosed examples, the central portion of the griddle includes a drain formed by an opening extending through the upper surface and the lower surface of the central portion of the griddle.

In some disclosed examples, the upper surface of the central portion of the griddle is sloped relative to an upper surface of a central portion of the sear grate.

In some disclosed examples, the griddle includes an interlock pin configured to be inserted into an interlock pin opening of the sear grate.

In some disclosed examples, the griddle includes a lip coupled to and extending upwardly from the central portion of the griddle.

In some disclosed examples, the griddle includes an interlock tab coupled to and extending outwardly from the lip of the griddle. In some disclosed examples, the interlock tab is configured to abut an interlock tab guide of the sear grate when the griddle is interlocked to the sear grate.

In some disclosed examples, the griddle includes feet coupled to and extending downwardly from the central portion of the griddle. In some disclosed examples, the feet are configured to be located within a central opening of a modular grate system when the portable cooking station is docked on the modular grate system.

In some examples, a sear grate of a portable cooking station is disclosed. In some disclosed examples, the sear grate comprises a central portion having an upper surface, a lower surface located opposite the upper surface, and a sear pattern formed by openings extending through the upper surface and the lower surface. In some disclosed examples, the sear grate further comprises an interlock pin opening configured to receive an interlock pin of a griddle of the portable cooking station to interlock the griddle to the sear grate in a side-by-side arrangement.

In some disclosed examples, the sear grate further comprises a lip coupled to and extending upwardly from the central portion of the sear grate.

In some disclosed examples, the lip of the sear grate includes an interlock tab guide configured to guide an interlock tab of the griddle into a position that facilitates interlocking the griddle to the sear grate.

In some examples, a griddle of a portable cooking station is disclosed. In some disclosed examples, the griddle comprises a central portion having an upper surface, a lower surface located opposite the upper surface, and a drain formed by an opening extending through the upper surface and the lower surface. In some disclosed examples, the griddle further comprises an interlock pin configured to be inserted into an interlock pin opening of a sear grate of the portable cooking station to interlock the griddle to the sear grate in a side-by-side arrangement.

In some disclosed examples, the upper surface of the central portion of the griddle is sloped relative to an upper surface of a central portion of the sear grate.

In some disclosed examples, the griddle further comprises a lip coupled to and extending upwardly from the central portion of the griddle.

In some disclosed examples, the griddle further comprises an interlock tab coupled to and extending outwardly from the lip of the griddle. In some disclosed examples, the interlock tab is configured to abut an interlock tab guide of the sear grate when the griddle is interlocked to the sear grate.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A portable cooking station, comprising:
    a sear grate including a first central potion, a first lip, and an interlock pin opening, the first central portion having a first upper surface and a first lower surface opposite the first upper surface, the first lip coupled to and extending upwardly from the first central portion, the first lip including a first interlock tab guide and a second interlock tab guide located opposite the first interlock tab guide, the interlock pin opening located between the first interlock tab guide and the second interlock tab guide, the interlock pin opening extending through the first upper surface and the first lower surface of the first central portion; and
    a griddle configured to be removably interlocked to the sear grate in a side-by-side arrangement, the griddle including a second central portion, a second lip, an interlock tab, and an interlock pin, the second central portion having a second upper surface and second lower surface located opposite the second upper surface, the second lip coupled to and extending upwardly from the second central portion, the interlock tab coupled to and extending outwardly from the second lip, the interlock tab having an outer edge, the interlock pin coupled to and extending downwardly from the interlock tab, the interlock pin configured to be inserted into the interlock pin opening;
    wherein the first interlock tab guide and the second interlock tab guide are respectively configured to be contacted by the outer edge of the interlock tab to guide the interlock pin into the interlock pin opening in connection with interlocking the griddle to the sear grate, and wherein insertion of the interlock pin into the interlock pin opening prevents lateral movement of the griddle relative to the sear grate.

2. The portable cooking station of claim 1, wherein the sear grate includes a sear pattern formed by diamond-shaped openings extending through the first upper surface and the first lower surface.

3. The portable cooking station of claim 1, wherein the sear grate includes first feet coupled to and extending downwardly from the first central portion, the first feet being configured to be located within a central opening of a modular grate system when the portable cooking station is docked on the modular grate system.

4. The portable cooking apparatus of claim 3, wherein the first feet are integrally formed with the first central portion.

5. The portable cooking station of claim 1, wherein the second central portion includes a drain formed by an opening extending through the second upper surface and the second lower surface.

6. The portable cooking station of claim 5, wherein the second upper surface of the second central portion of the griddle is sloped relative to the first upper surface of the first central portion of the sear grate, and wherein the second upper surface of the second central portion of the griddle slopes downward toward the drain.

7. The portable cooking station of claim 1, wherein the outer edge of the interlock tab abuts the first interlock tab guide and the second interlock tab guide when the griddle is interlocked to the sear grate.

8. The portable cooking station of claim 1, wherein the griddle includes second feet coupled to and extending downwardly from the second central portion, the second feet being configured to be located within a central opening of a modular grate system when the portable cooking station is docked on the modular grate system.

9. The portable cooking apparatus of claim 8, wherein the second feet are integrally formed with the second central portion.

10. The portable cooking apparatus of claim 1, wherein the first lip is integrally formed with the first central portion, and the second lip is integrally formed with the second central portion.

11. The portable cooking apparatus of claim 1, wherein the interlock tab is integrally formed with the second lip.

12. The portable cooking apparatus of claim 1, wherein the interlock pin is integrally formed with the interlock tab.

13. The portable cooking apparatus of claim 1, wherein the interlock tab has a trapezoidal shape.

14. The portable cooking station of claim 1, wherein the interlock pin has a first circular profile and the interlock pin opening has a second circular profile configured to receive the first circular profile, wherein the first circular profile of the interlock pin is circumferentially bounded by the second circular profile of the interlock pin opening when the interlock pin is inserted into the interlock pin opening.

15. The portable cooking station of claim 1, wherein the interlock pin opening and the interlock pin are respectively configured to facilitate insertion of the interlock pin into the interlock pin opening along a vertical direction that is perpendicular to a horizontal plane defined by the first upper surface of the first central portion of the sear grate.

16. A portable cooking station, comprising:
a sear grate including a first central potion, a first lip, and an interlock pin opening, the first central portion having a first upper surface and a first lower surface opposite the first upper surface, the first lip integrally formed with and extending upwardly from the first central portion, the first lip including a first interlock tab guide and a second interlock tab guide located opposite the first interlock tab guide, the interlock pin opening located between the first interlock tab guide and the second interlock tab guide, the interlock pin opening extending through the first upper surface and the first lower surface of the first central portion; and
a griddle configured to be removably interlocked to the sear grate in a side-by-side arrangement, the griddle including a second central portion, a second lip, an interlock tab, and an interlock pin, the second central portion having a second upper surface and second lower surface located opposite the second upper surface, the second lip integrally formed with and extending upwardly from the second central portion, the interlock tab integrally formed with and extending outwardly from the second lip, the interlock tab having an outer edge, the interlock pin integrally formed with and extending downwardly from the interlock tab, the interlock pin configured to be inserted into the interlock pin opening;
wherein the first interlock tab guide and the second interlock tab guide are respectively configured to be contacted by the outer edge of the interlock tab to guide the interlock pin into the interlock pin opening in connection with interlocking the griddle to the sear grate, and wherein insertion of the interlock pin into the interlock pin opening prevents lateral movement of the griddle relative to the sear grate.

17. The portable cooking station of claim 16, wherein the sear grate includes a sear pattern formed by diamond-shaped openings extending through the first upper surface and the first lower surface.

18. The portable cooking station of claim 16, wherein the sear grate includes first feet integrally formed with and extending downwardly from the first central portion, the first feet being configured to be located within a central opening of a modular grate system when the portable cooking station is docked on the modular grate system.

19. The portable cooking station of claim 16, wherein the second central portion includes a drain formed by an opening extending through the second upper surface and the second lower surface.

20. The portable cooking station of claim 19, wherein the second upper surface of the second central portion of the griddle is sloped relative to the first upper surface of the first central portion of the sear grate, and wherein the second upper surface of the second central portion of the griddle slopes downward toward the drain.

21. The portable cooking station of claim 16, wherein the outer edge of the interlock tab abuts the first interlock tab guide and the second interlock tab guide when the griddle is interlocked to the sear grate.

22. The portable cooking station of claim 16, wherein the griddle includes second feet integrally formed with and extending downwardly from the second central portion, the second feet being configured to be located within a central opening of a modular grate system when the portable cooking station is docked on the modular grate system.

* * * * *

UNITED STATES PATENT AND TRADEMARK OFFICE
CERTIFICATE OF CORRECTION

PATENT NO. : 11,871,871 B2
APPLICATION NO. : 16/932261
DATED : January 16, 2024
INVENTOR(S) : Cassandra A. S. McVey, Romualdo Sonny Siazon and Brett Jessogne Page 1 of 1

It is certified that error appears in the above-identified patent and that said Letters Patent is hereby corrected as shown below:

In the Claims

Column 13, Claim 1, Line 65: replace "a first central potion" with --a first central portion--.

Column 14, Claim 1, Lines 14-15: replace "and second lower surface" with --and a second lower surface--.

Column 15, Claim 16, Line 25: replace "a first central potion" with --a first central portion--.

Column 15, Claim 16, Lines 41-42: replace "and second lower surface" with --and a second lower surface--.

Signed and Sealed this
Twentieth Day of May, 2025

Coke Morgan Stewart
*Acting Director of the United States Patent and Trademark Office*